US011489198B2

(12) United States Patent
Moloy et al.

(10) Patent No.: US 11,489,198 B2
(45) Date of Patent: Nov. 1, 2022

(54) NONAQUEOUS ELECTROLYTE COMPOSITIONS COMPRISING SILYL OXALATES

(71) Applicant: SOLVAY SA, Brussels (BE)

(72) Inventors: Kenneth Gene Moloy, Hockessin, DE (US); Stephen E. Burkhardt, Wilmington, DE (US); Kostantinos Kourtakis, Media, PA (US); Brian Levy-Polis, Newark, DE (US)

(73) Assignee: Solvay SA, Brussels (BE)

( * ) Notice: Subject to any disclaimer, the term of this patent is extended or adjusted under 35 U.S.C. 154(b) by 558 days.

(21) Appl. No.: 16/326,466

(22) PCT Filed: Jul. 27, 2017

(86) PCT No.: PCT/EP2017/068970
§ 371 (c)(1),
(2) Date: Feb. 19, 2019

(87) PCT Pub. No.: WO2018/033357
PCT Pub. Date: Feb. 22, 2018

(65) Prior Publication Data
US 2019/0245243 A1 Aug. 8, 2019

Related U.S. Application Data

(60) Provisional application No. 62/377,136, filed on Aug. 19, 2016.

(51) Int. Cl.
*H01M 10/0567* (2010.01)
*H01M 10/0569* (2010.01)
*C07F 7/18* (2006.01)
*H01M 10/0568* (2010.01)
*H01M 10/0525* (2010.01)

(52) U.S. Cl.
CPC ....... *H01M 10/0567* (2013.01); *C07F 7/1896* (2013.01); *H01M 10/0568* (2013.01);
(Continued)

(58) Field of Classification Search
CPC ............... H01M 10/0567; H01M 10/0568
See application file for complete search history.

(56) References Cited

U.S. PATENT DOCUMENTS

2004/0034253 A1* 2/2004 Angell ............... H01M 10/052
568/6
2015/0171476 A1* 6/2015 Onozaki ........... H01M 10/0567
429/332
2016/0315354 A1 10/2016 Okada et al.

FOREIGN PATENT DOCUMENTS

JP 2009-032491 A1 2/2009
JP 2013145702 A * 7/2013
(Continued)

OTHER PUBLICATIONS

N. P. Erchak et al., "29Si NMR Spectroscopic Study of a Series of Five-, Six-, and Seven-Coordinate Silicon Compounds", Russian Journal of General Chemistry, vol. 77, No. 12, Dec. 1, 2007, pp. 2210-2211.
(Continued)

*Primary Examiner* — Maria Laios
*Assistant Examiner* — Jordan E Berresford
(74) *Attorney, Agent, or Firm* — Osha Bergman Watanabe & Burton LLP

(57) ABSTRACT

Disclosed herein are electrolyte compositions comprising a fluorinated solvent, at least one silyl oxalate represented by the formulas $RR'Si(C_2O_4)$, wherein R and R' are each the same or different from each other and independently selected from $C_1$-$C_8$ alkyl, $C_2$-$C_8$ alkenyl, $C_2$-$C_8$ alkynyl, or $C_6$-$C_{10}$ aryl radical, optionally comprising at least one substituent selected from halogen, hydroxyl, alkoxy, carbonyl, and carboxyl groups; and LiPF6. Also disclosed herein are electrolyte compositions comprising a fluorinated solvent and a lithium oxalato phosphate salt represented by the formula $LiPF_{(6-2q)}(C_2O_4)_q$, wherein q is 1, 2 or 3; wherein
(Continued)

the oxalato phosphate salt comprises at least a portion that is derived from at least one silyl oxalate as defined herein. The electrolyte compositions are useful in electrochemical cells, such as lithium ion batteries.

17 Claims, 2 Drawing Sheets

(52) U.S. Cl.
CPC .... *H01M 10/0569* (2013.01); *H01M 10/0525* (2013.01); *H01M 2300/0034* (2013.01)

(56) References Cited

FOREIGN PATENT DOCUMENTS

| | | |
|---|---|---|
| WO | 2015045350 A1 | 4/2015 |
| WO | 2015093435 A1 | 6/2015 |

OTHER PUBLICATIONS

Kurt Schank et al., "Chemiluminescent and Non-Chemiluminescent Ozonations of selected Electron-Rich Alkynes in Halomethanes", Helvetica Chimica Acta, vol. 83, No. 7, Jul. 5, 2000, pp. 1611-1624.

M. D. Green et al., "Thermal, Rheological, and Ion-Transport Properties of Phosphonium-Based Ionic Liquids", The Journal of Physical Chemistry A, 2011, vol. 115, pp. 13829-13835.

E. Feghali et al. "Catalytic hydrosilylation of oxalic acid: chemoselective formation of functionalized C2-products", Catalysis Science & Technology, 2014, vol. 4, pp. 2230-2234.

Von G. Schott et al. "Über die Stabilität von Bis(triorgano-silyl)-oxalaten", Zeitschrift für anorganische und allgemeine Chemie, Band 352, 1967, pp. 45-52. (with English Language Summary).

* cited by examiner

NONAQUEOUS ELECTROLYTE COMPOSITIONS COMPRISING SILYL OXALATES

This application is a U.S. national phase entry under 35 U.S.C. § 371 of International Application No. PCT/EP2017/068970, filed on Jul. 27, 2017, which claims priority to U.S. Provisional Application No. 62/377,136, filed on Aug. 19, 2016. The entire contents of these applications are explicitly incorporated herein by this reference.

FIELD OF DISCLOSURE

The disclosure herein relates electrolyte compositions comprising silyl oxalates. The electrolyte compositions are useful in electrochemical cells, such as lithium ion batteries.

BACKGROUND

Batteries containing electrodes made from alkali metals, alkaline earth metals, or compounds comprising these metals—for example lithium ion batteries—typically incorporate electrolytes, additives and non-aqueous solvents for the electrolytes used in the batteries. Additives can enhance the performance and safety of the battery, and therefore a suitable solvent must dissolve the electrolyte as well as the additives. The solvent must also be stable under the conditions prevalent in an active battery system.

Electrolyte solvents used in lithium ion batteries typically incorporate organic carbonate compounds or mixtures, and typically include one or more linear carbonates such as, for example, ethyl methyl carbonate, dimethyl carbonate, or diethyl carbonate. Cyclic carbonates, such as ethylene carbonate, can also be included. However, at cathode potentials above about 4.35 V these electrolyte solvents can decompose, which can result in a loss of battery performance.

Various approaches have been investigated to overcome the limitations of commonly used non-aqueous electrolyte solvents. Although these electrolyte solvents can be used in lithium ion batteries having high cathode potentials, specifically at voltages greater than about 4.35 V, such as $LiCoO_2$ or $LiNi_xMn_yCo_zO_2$ where x+y+z is about 1, cycling performance—that is, the ability to efficiently discharge and charge the battery to full capacity multiple times—can be limited.

A synthesis method of bis(trimethylsilyl)oxalate has been disclosed in the scientific publication of Green et al ("Thermal, Rheological, and Ion-Transport Properties of Phosphonium-Based Ionic Liquids", The Journal of Physical Chemistry A, 2011, 115, 13829-13835). The same method has been used by Feghali et al ("Catalytic hydrosilylation of oxalic acid: chemoselective formation of functionalized C2-products", Catalysis Science & technology, 2014, 4, 2230-2234). The preparation and the thermal stability of bis(triorganosilyl)oxalate was already investigated by Von G. Schott and G. Henneberg in 1967 ("Über die Stabilität von Bis(triorgano-silyl)-oxalaten", Zeitschrift fir anorganische und allgemeine Chemie, Band 352, 1967).

The Japanese patent application JP2009-032491 discloses an electrolytic composition for a battery comprising a compound having an oxalic acid silyl ester type structure.

A need remains for electrolyte solvent formulations that will have improved performance when used in a lithium ion battery, particularly such a battery that operates with a high cathode potential (from about 4.1 up to about 5 V).

SUMMARY

In one aspect, the present application discloses an electrolyte composition comprising a fluorinated solvent, at least one silyl oxalate represented by Formula I:

$$RR'Si(C_2O_4) \qquad (I),$$

wherein R, and R' are each the same or different from each other and independently selected from $C_1$-$C_8$ alkyl, $C_2$-$C_8$ alkenyl, $C_2$-$C_8$ alkynyl, or $C_6$-$C_{10}$ aryl radical, optionally comprising at least one substituent selected from halogen, hydroxyl, alkoxy, carbonyl, and carboxyl groups, and $LiPF_6$.

In another aspect, there is provided an electrolyte composition comprising a fluorinated solvent, and a lithium oxalato phosphate salt represented by Formula III:

$$LiPF_{(6-2q)}(C_2O_4)_q \qquad (III)$$

wherein q is 1, 2 or 3;
wherein the oxalato phosphate salt comprises at least a portion that is derived from at least one silyl oxalate represented by Formula I:

$$RR'Si(C_2O_4) \qquad (I),$$

wherein R, and R' are each the same or different from each other and independently selected from $C_1$-$C_8$ alkyl, $C_2$-$C_8$ alkenyl, $C_2$-$C_8$ alkynyl, or $C_6$-$C_{10}$ aryl radical, optionally comprising at least one substituent selected from halogen, hydroxyl, alkoxy, carbonyl, and carboxyl groups.

In one embodiment, R, and R' are each independently methyl, ethyl, or phenyl. In one embodiment, the silyl oxalate comprises dimethylsilyl oxalate, vinylphenylsilyl oxalate, methylvinylsilyl oxalate, or diphenylsilyl oxalate.

In one embodiment, the fluorinated solvent is at least one fluorinated solvent selected from fluorinated acyclic carboxylic acid esters, fluorinated acyclic carbonates, and fluorinated acyclic ethers. In some embodiments, the fluorinated acyclic carboxylic acid ester comprises 2,2-difluoroethyl acetate.

In one embodiment, the electrolyte composition further comprises an additive such as a lithium boron compound, a cyclic sultone, a cyclic sulfate, a cyclic carboxylic acid anhydride, or a combination thereof.

In another embodiment, there is provided herein an electrochemical cell comprising an electrolyte composition disclosed herein. In another embodiment, the electrochemical cell is a lithium ion battery. In a further embodiment, the electrochemical cell is a lithium ion battery operating at a potential of greater than about 4.1V.

In yet another embodiment, a method to form an electrolyte composition is disclosed, the method comprising a step of combining a fluorinated solvent, at least one silyl oxalate represented by Formula I:

$$RR'Si(C_2O_4) \qquad (I),$$

wherein R, and R' are each the same or different from each other and independently selected from $C_1$-$C_8$ alkyl, $C_2$-$C_8$ alkenyl, $C_2$-$C_8$ alkynyl, or $C_6$-$C_{10}$ aryl radical, optionally comprising at least one substituent selected from halogen, hydroxyl, alkoxy, carbonyl, and carboxyl groups, and $LiPF_6$.

Also disclosed herein are dialkylsilyl oxalates of the formula $RR'Si(C_2O_4)$, wherein R and R' are each independently methyl, ethyl, n-propyl, iso-propyl, vinyl, or phenyl. In one embodiment, R and R' are each methyl. In another embodiment, R is methyl and R' is ethyl, vinyl, or phenyl.

Other aspects of the disclosed, invention may be inherent or understood from the disclosure provided herein even though not specifically described with particularity or completely embodied in a single example of this application, but which may nonetheless be synthesized by one of ordinary skill in the art from the totality of the description, the examples, and the claims provided in the present application, that is, the whole of this specification.

DETAILED DESCRIPTION

Figure 1:
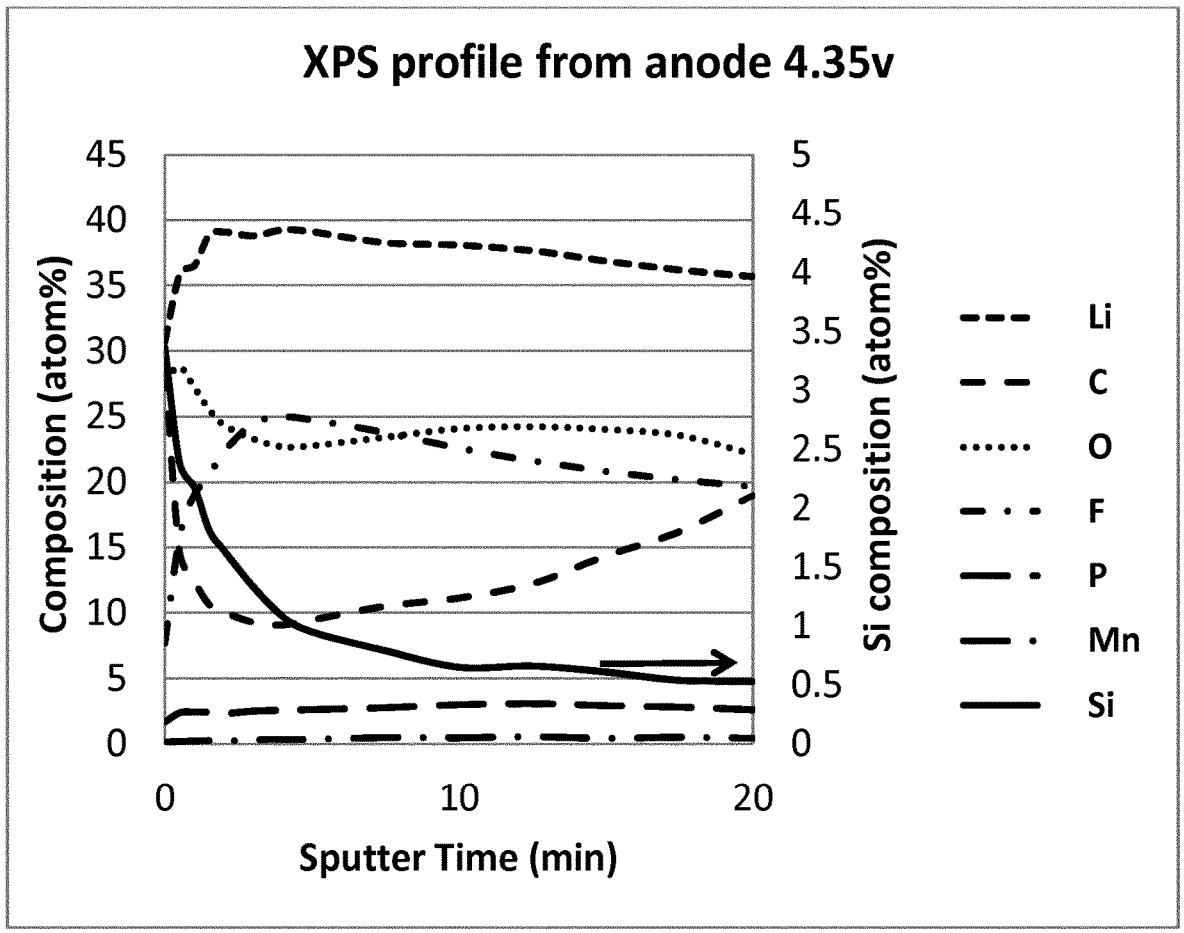
FIG. 1 shows the X-ray photoelectron spectroscopy depth profile of in-depth composition (atom %) from an anode of a coin cell of Comparative Example D after cycling.

As used above and throughout the disclosure, the following terms, unless otherwise indicated, shall be defined as follows:

The term "electrolyte composition" as used herein, refers to a chemical composition that includes—at a minimum—a solvent for an electrolyte salt and an electrolyte salt, wherein the composition is capable of supplying an electrolyte in an electrochemical cell. An electrolyte composition can include other components, for example additives to enhance the performance of the battery in safety, reliability, and or efficiency.

The term "electrolyte salt" as used herein, refers to an ionic salt that is at least partially soluble in the solvent of the electrolyte composition and that at least partially dissociates into ions in the solvent of the electrolyte composition to form a conductive electrolyte composition.

An "electrolyte solvent" as defined herein is a solvent or a solvent mixture for an electrolyte composition that comprises a fluorinated solvent.

The term "anode" refers to the electrode of an electrochemical cell, at which oxidation occurs. In a secondary (i.e. rechargeable) battery, the anode is the electrode at which oxidation occurs during discharge and reduction occurs during charging.

The term "cathode" refers to the electrode of an electrochemical cell, at which reduction occurs. In a secondary (i.e. rechargeable) battery, the cathode is the electrode at which reduction occurs during discharge and oxidation occurs during charging.

The term "lithium ion battery" refers to a type of rechargeable battery in which lithium ions move from the anode to the cathode during discharge and from the cathode to the anode during charge.

The equilibrium potential between lithium and lithium ion is the potential of a reference electrode using lithium metal in contact with the non-aqueous electrolyte containing lithium salt at a concentration sufficient to give about 1 mole/liter of lithium ion concentration, and subjected to sufficiently small currents so that the potential of the reference electrode is not significantly altered from its equilibrium value ($Li/Li^+$). The potential of such a $Li/Li^+$ reference electrode is assigned here the value of 0.0V. Potential of an anode or cathode means the potential difference between the anode or cathode and that of a $Li/Li^+$ reference electrode. Herein voltage means the voltage difference between the cathode and the anode of a cell, neither electrode of which may be operating at a potential of 0.0V.

An energy storage device is a device that is designed to provide electrical energy on demand, such as a battery or a capacitor. Energy storage devices contemplated herein at least in part provide energy from electrochemical sources.

The term "SEI", as used herein, refers to a solid electrolyte interphase layer formed on the active material of an electrode. A lithium-ion secondary electrochemical cell is assembled in an uncharged state and must be charged (a process called formation) for use. During the first few charging events (battery formation) of a lithium-ion secondary electrochemical cell, components of the electrolyte are reduced or otherwise decomposed or incorporated onto the surface of the negative active material and oxidized or otherwise decomposed or incorporated onto the surface of the positive active material, electrochemically forming a solid-electrolyte interphase on the active materials. These layers, which are electrically insulating but ionically conducting, help prevent decomposition of the electrolyte and can extend the cycle life and improve the performance of the battery. On the anode, the SEI can suppress the reductive decomposition of the electrolyte; on the cathode, the SEI can suppress the oxidation of the electrolyte components.

As used herein, the terms "Ox", "oxalato", and "$C_2O_4$" are used interchangeably and refer to an oxalate moiety coordinated to an atom, for example phosphorus or silicon.

The term "alkyl group", as used herein, refers to linear, branched, and cyclic hydrocarbon groups containing from 1 to 20 carbons and containing no unsaturation. Examples of straight chain alkyl radicals include methyl, ethyl, propyl, butyl, pentyl, hexyl, heptyl, octyl, nonyl, decyl, undecyl, and dodecyl. Examples of branched chain isomers of straight chain alkyl groups include isopropyl, iso-butyl, tert-butyl, sec-butyl, isopentyl, neopentyl, isohexyl, neohexyl, and isooctyl. Examples of cyclic alkyl groups include cyclopropyl, cyclobutyl, cyclopentyl, cyclohexyl, cycloheptyl, and cyclooctyl.

The term "fluoroalkyl group", as used herein, refers to an alkyl group wherein at least one hydrogen is replaced by fluorine.

The term "alkenyl group", as used herein, refers to linear, branched, and cyclic groups as described with respect to alkyl group as defined herein, except that at least one double bond exists between two carbon atoms. Examples of alkenyl groups include vinyl, cyclohexenyl, cyclopentenyl, cyclohexadienyl, and butadienyl.

The term "alkynyl group", as used herein, refers to linear and branched groups as described with respect to alkyl group as defined herein, except that at least one triple bond exists between two carbon atoms.

The term "carbonate" as used herein refers specifically to an organic carbonate, wherein the organic carbonate is a dialkyl diester derivative of carbonic acid, the organic carbonate having a general formula $R^aOCOOR^b$, wherein $R^a$ and $R^b$ are each independently selected from alkyl groups having at least one carbon atom, wherein the alkyl substituents can be the same or different, can be saturated or unsaturated, substituted or unsubstituted, can form a cyclic structure via interconnected atoms, or include a cyclic structure as a substituent of either or both of the alkyl groups.

Disclosed herein are electrolyte compositions comprising a fluorinated solvent, at least one silyl oxalate compound as defined herein, and lithium hexafluorophosphate ($LiPF_6$). Also disclosed herein are electrolyte compositions comprising a fluorinated solvent and a lithium oxalato phosphate salt as defined herein, wherein the oxalato phosphate salt comprises at least a portion that is derived from at least one silyl oxalate compound. The electrolyte compositions are useful in electrochemical cells, such as lithium ion batteries.

In one embodiment, an electrolyte composition comprises:
a) a fluorinated solvent;
b) at least one silyl oxalate represented by Formula I:

$$RR'Si(C_2O_4) \tag{I}$$

wherein R, and R' are each the same or different from each other and independently selected from $C_1$-$C_8$ alkyl, $C_2$-$C_8$ alkenyl, $C_2$-$C_8$ alkynyl, or $C_6$-$C_{10}$ aryl radical, optionally comprising at least one substituent selected from halogen, hydroxyl, alkoxy, carbonyl, and carboxyl groups; and
c) $LiPF_6$.

In one embodiment, R, and R' are each independently methyl, ethyl, or phenyl.

In one embodiment, the silyl oxalate comprises dimethylsilyl oxalate, vinylphenylsilyl oxalate, methylvinylsilyl oxalate, or diphenylsilyl oxalate.

In one embodiment, the electrolyte composition comprises at least one silyl oxalate, wherein the silyl oxalate is represented by Formula I:

$$RR'Si(C_2O_4) \tag{I}$$

wherein R and R' are each the same or different from each other and independently selected from $C_1$-$C_8$ alkyl, $C_2$-$C_8$ alkenyl, $C_2$-$C_8$ alkynyl, or $C_6$-$C_{10}$ aryl radical, optionally comprising at least one substituent selected from halogen, hydroxyl, alkoxy, carbonyl, and carboxyl groups. Silyl oxalates of Formula I can also be represented by the structural formula IA shown here:

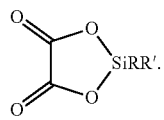

Formula IA

Silyl oxalates of Formula I are neutral molecules wherein the silicon atom is tetravalent and the oxalate moiety ($C_2O_4$) forms a 5-membered cyclic structure with the silicon atom, wherein the silicon atom is bonded to each of the single-bonded oxygen atoms of the oxalate moiety as well as to the R and R' radicals. The R and R' radicals can be independently cyclic, linear, or branched. In some embodiments, R and R' are independently selected from methyl, ethyl, n-propyl, iso-propyl, n-butyl, sec-butyl, iso-butyl, tert-butyl, pentyl, hexyl, heptyl, octyl, phenyl, and vinyl radicals. In some embodiments, the R and R' radicals are substituted with one or more substituents selected from halogen, hydroxyl, alkoxy, carbonyl, and carboxyl groups. By "halogen group" is meant F, Cl, Br, or I. In some embodiments, the R and R' radicals are substituted with fluorine. In one embodiment, the silyl oxalate comprises dimethylsilyl oxalate, vinylphenylsilyl oxalate, methylvinylsilyl oxalate, or diphenylsilyl oxalate. In one embodiment, the silyl oxalate comprises dimethylsilyl oxalate.

The silyl oxalates of Formula I can generally be prepared by reacting oxalic acid with an slight stoichiometric excess of the corresponding chlorosilane containing R and R'. A useful silane:oxalate molar ratio can be in the range of about 1.1:1 to about 1.3:1, for example about 1.2:1. For example, dimethyl silyl oxalate can be prepared by the reaction of oxalic acid and dichlorodimethylsilane. Dimethyl silyl oxalate can be prepared by the reaction of oxalic acid and dichlorodimethylsilane. Methylvinylsilyl oxalate can be prepared by the reaction of oxalic acid and dichloromethylvinyl silane.

In some embodiments, a silyl oxalate of Formula I is a dialkylsilyl oxalate of the formula $RR'Si(C_2O_4)$, wherein R and R' are each independently methyl, ethyl, n-propyl, iso-propyl, vinyl, or phenyl. In one embodiment, R and R' are each methyl. In another embodiment, R is methyl and R' is ethyl, vinyl, or phenyl.

It is further disclosed an electrolyte composition which comprises:
a) a fluorinated solvent;
b) at least one silyl oxalate represented by Formula II:

$$(RR'R''Si)_2(C_2O_4) \tag{II},$$

wherein R, R', and R'' are each the same or different from each other and independently selected from $C_1$-$C_8$ alkyl, $C_2$-$C_8$ alkenyl, $C_2$-$C_8$ alkynyl, or $C_6$-$C_{10}$ aryl radical, optionally comprising at least one substituent selected from halogen, hydroxyl, alkoxy, carbonyl, and carboxyl groups; and
c) $LiPF_6$.

In one embodiment, R, R', and R'' are each independently methyl, ethyl, or phenyl. In one embodiment, the silyl oxalate comprises dimethylsilyl oxalate, bis(trimethylsilyl) oxalate, vinylphenylsilyl oxalate, methylvinylsilyl oxalate, or diphenylsilyl oxalate.

According to this embodiment, the electrolyte composition comprises at least one silyl oxalate, wherein the silyl oxalate is represented by Formula II:

$$(RR'R''Si)_2(C_2O_4) \tag{II}$$

wherein R, R', and R'' are each the same or different from each other and independently selected from $C_1$-$C_8$ alkyl, $C_2$-$C_8$ alkenyl, $C_2$-$C_8$ alkynyl, or $C_6$-$C_{10}$ aryl radical, optionally comprising at least one substituent selected from halogen, hydroxyl, alkoxy, carbonyl, and carboxyl groups. Silyl oxalates of Formula II can also be represented by the structural formula IIA shown here:

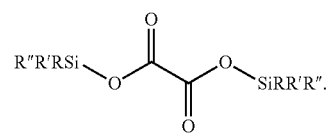

Formula IIA

Silyl oxalates of Formula II are neutral molecules wherein each silicon atom is tetravalent and is bonded to the R, R', and R'' radicals. Each silicon atom is also bonded to one of the single-bonded oxygen atoms of an oxalate moiety, such that one oxalate moiety bridges two silicon atoms. The R, R', and R'' radicals can be independently cyclic, linear, or branched. In some embodiments, R, R', and R'' are independently selected from methyl, ethyl, n-propyl, iso-propyl, n-butyl, sec-butyl, iso-butyl, tert-butyl, pentyl, hexyl, heptyl, octyl, phenyl, and vinyl radicals. In some embodiments, the R, R', and R'' radicals are substituted with one or more substituents selected from halogen, hydroxyl, alkoxy, carbonyl, and carboxyl groups. In some embodiments, the R and R' radicals are substituted with fluorine. In one embodiment, the silyl oxalate comprises bis(trimethylsilyl)oxalate.

The silyl oxalates of Formula II can generally be prepared by the reaction of oxalic acid with a stoichiometric excess of a chlorosilane containing R, R', and R''. Typically, the molar ratio of the silane to the oxalate is in the range of about 2.8:1 to about 3:1, for example approximately 2.9.

The at least one silyl oxalate can be used in various amounts depending on the desired properties of the electrolyte composition. In one embodiment, the silyl oxalate is present in the electrolyte composition in the range of from about 0.1 percent by weight to about 10 percent by weight, based on the total weight of the electrolyte composition. In other embodiments, the silyl oxalate is present in the electrolyte composition in a percentage by weight range that is defined by a lower limit and an upper limit. The lower limit of the range is 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.2, 2.4, 2.6, 2.8, 3, 3.2, 3.4, 3.6, 3.8, 4, 4.2, 4.4, 4.6, 4.8, or 5 and the upper limit of the range is 5.1, 5.2, 5.3, 5.4, 5.5, 5.6, 5.7, 5.8, 5.9, 6, 6.2, 6.4, 6.6, 6.8, 7, 7.2, 7.4, 7.6, 7.8, 8, 8.2, 8.4, 8.6, 8.8, 9, 9.2, 9.4, 9.6, 9.8, or 10. All percentages by weight are based on the total weight of the electrolyte composition.

The use of at least one silyl oxalate in an electrolyte composition can provide improved performance of a lithium battery or other energy storage device, such as a capacitor. Without being held to theory, the improvement may result from reaction of the silyl oxalate with an oxalate-reactive component in the electrolyte composition to form an electrolyte additive in situ. An oxalate-reactive component can be any component of the mixture that can react with an oxalate source, such as a silyl oxalate, whereby at least one bond to the oxalate-reactive component is formed with an anionic oxygen from an oxalate source. Alternatively, the oxalate may form an addition product with the oxalate-reactive component that does not require displacement of a substituent from the oxalate-reactive component.

In some embodiments, the oxalate-reactive material can be an electrolyte salt which can be present in an amount in excess of its requirements for the conductivity of the electrolyte composition. In other embodiments, the oxalate-reactive material can be an additional component present in combination with the electrolyte salt. Under appropriate conditions, the oxalate-reactive material can react with a silyl oxalate of the type described herein to form the oxalate salt of the oxalate-reactive material.

Examples of oxalate-reactive compounds include fluorinated phosphates such as lithium hexafluorophosphate (LiPF$_6$) and lithium trifluorotris(perfluoroethyl)phosphate [LiPF$_3$(C$_2$F$_5$)$_3$], as well as lithium oxalato phosphate salts such as lithium tetrafluoro(oxalato)phosphate [LiPF$_4$(C$_2$O$_4$)] and lithium difluorobis(oxalato)phosphate [LiPF$_2$(C$_2$O$_4$)$_2$]. Other useful oxalate-reactive compounds include fluorinated borates and fluorinated arsenates. In one embodiment, the oxalate-reactive material comprises LiPF$_6$. In one embodiment, the oxalate-reactive material comprises LiPF$_4$(C$_2$O$_4$). In one embodiment, the oxalate-reactive material comprises LiPF$_2$(C$_2$O$_4$)$_2$. In one embodiment, the oxalate-reactive material comprises LiPF$_3$(C$_2$F$_5$)$_3$. In one embodiment, the oxalate-reactive material comprises LiBF$_4$. In one embodiment, the oxalate-reactive material comprises LiAsF$_6$.

In one embodiment, at least a portion of the oxalate salt is provided by a reaction between the silyl oxalate with an oxalate-reactive component. A suitable silyl oxalate is one that is sufficiently active to displace a substituent on the oxalate-reactive component under the conditions of storage or use of the electrolyte composition, to form an oxalate salt of the oxalate-reactive component. In one embodiment, the oxalate salt comprises a lithium oxalate phosphate salt, and the oxalato phosphate salt comprises at least a portion that is derived from at least one silyl oxalate represented by Formula I as defined herein above.

In one embodiment, an electrolyte composition comprises:
a) a fluorinated solvent; and
b) a lithium oxalato phosphate salt represented by Formula III:

$$\text{LiPF}_{(6-2q)}(\text{C}_2\text{O}_4)_q \quad\quad (III)$$

wherein q is 1, 2 or 3; and
wherein the oxalato phosphate salt comprises at least a portion that is derived from at least one silyl oxalate represented by Formula I:

$$\text{RR'Si}(\text{C}_2\text{O}_4) \quad\quad (I),$$

wherein R, and R' are each the same or different from each other and independently selected from C$_1$-C$_8$ alkyl, C$_2$-C$_8$ alkenyl, C$_2$-C$_8$ alkynyl, or C$_6$-C$_{10}$ aryl radical, optionally comprising at least one substituent selected from halogen, hydroxyl, alkoxy, carbonyl, and carboxyl groups. When q=3, the lithium oxalato phosphate salt is lithium tris (oxalato) phosphate, LiP(C$_2$O$_4$)$_3$, which is abbreviated herein as LiTOP. When q=2, the lithium oxalato phosphate is lithium difluorobis(oxalato) phosphate, LiPF$_2$(C$_2$O$_4$)$_2$. When q=1, the lithium oxalato phosphate is lithium tetrafluoro(oxalato) phosphate, LiPF$_4$(C$_2$O$_4$). In one embodiment, the electrolyte composition comprises lithium tris (oxalato) phosphate as an oxalato phosphate salt. In one embodiment, the electrolyte composition comprises lithium difluorobis(oxalato) phosphate as an oxalato phosphate salt. In one embodiment, the electrolyte composition comprises lithium tetrafluoro(oxalato) phosphate as an oxalato phosphate salt.

Electrolyte solvent mixtures comprising lithium oxalato phosphate complexes in fluorinated solvents as described herein may comprise oxalato phosphate salts that exist in various stages or degrees of complexation, including, for example, intermediate forms wherein the oxalate group forms a mono-dentate complex with phosphorus, wherein just one of the single bonded oxygen atoms of an oxalate moiety is bonded to phosphorus. The bi-dentate form, wherein both single-bonded oxygen atoms from the oxalate are bonded to phosphorus, is typically the predominant form. For convenience, the term "oxalato-phosphate(s)" shall be used generically, unless stated otherwise, to refer to any individual oxalato phosphates, or alternatively any combination or all of the various compositions that can comprise oxalato phosphates defined by the Formula LiPF$_{(6-2q)}$(C$_2$O$_4$)$_q$, or that otherwise may exist in the composition.

In an electrolyte composition, the reaction of LiPF$_6$ and the silyl oxalates disclosed herein can occur at room temperature. Reaction times can vary from hours to days at room temperature, and can be accelerated with increasing temperatures. In one embodiment, the initial concentration of LiPF$_6$ in the electrolyte composition is higher than the concentration of the silyl oxalate. In one embodiment, the initial concentration of LiPF$_6$ in the electrolyte composition is about the same as the concentration of the silyl oxalate. The use of silyl oxalates in an electrolyte composition can, after electrochemical cycling, modify the composition of the solid electrolyte interphase (SEI) layer formed on the active material of an electrode. This modification may have a beneficial impact on the performance of the battery and its cycle life durability.

The electrolyte composition comprises LiPF$_6$. The LiPF$_6$ can be present in the electrolyte composition in an amount of about 0.2 M to about 2.0 M, for example from about 0.3 M to about 1.7 M, or for example from about 0.5 M to about 1.2 M, or for example 0.5 M to about 1.7M.

Optionally, the electrolyte compositions disclosed herein further comprise at least one additional electrolyte salt, in addition to LiPF$_6$. Suitable additional electrolyte salts include without limitation lithium bis(trifluoromethyl)tetrafluorophosphate (LiPF$_4$(CF$_3$)$_2$),
lithium bis(pentafluoroethyl)tetrafluorophosphate (LiPF$_4$(C$_2$F$_5$)$_2$),
lithium tris(pentafluoroethyl)trifluorophosphate (LiPF$_3$(C$_2$F$_5$)$_3$),
lithium bis(trifluoromethanesulfonyl)imide,
lithium bis(perfluoroethanesulfonyl)imide,
lithium (fluorosulfonyl) (nonafluorobutanesulfonyl)imide,
lithium bis(fluorosulfonyl)imide,
lithium tetrafluoroborate,
lithium perchlorate,
lithium hexafluoroarsenate,
lithium trifluoromethanesulfonate,
lithium tris(trifluoromethanesulfonyl)methide,
lithium bis(oxalato)borate,
lithium difluoro(oxalato)borate,
Li$_2$B$_{12}$F$_{12-x}$H$_x$ where x is equal to 0 to 8, and
mixtures of lithium fluoride and anion receptors such as B(OC$_6$F$_5$)$_3$.

Mixtures of two or more of these or comparable electrolyte salts may also be used. In one embodiment, the additional electrolyte salt comprises lithium bis(trifluoromethanesulfonyl)imide. The additional a electrolyte salt can be present in the electrolyte composition in an amount of about 0.2 M to about 2.0 M, for example from about 0.3 M to about 1.7 M, or for example from about 0.5 M to about 1.2 M, or for example 0.5 M to about 1.7M.

An electrolyte composition as described herein comprises one or more fluorinated solvents. The fluorinated solvent is at least one fluorinated solvent selected from fluorinated acyclic carboxylic acid esters, fluorinated acyclic carbonates, and fluorinated acyclic ethers.

Suitable fluorinated acyclic carboxylic acid esters are represented by the formula:

R$^1$—COO—R$^2$ wherein
i) R$^1$ is H, an alkyl group, or a fluoroalkyl group;
ii) R$^2$ is an alkyl group or a fluoroalkyl group;
iii) either or both of R$^1$ and R$^2$ comprises fluorine; and
iv) R$^1$ and R$^2$, taken as a pair, comprise at least two carbon atoms but not more than seven carbon atoms.

In one embodiment, R$^1$ is H and R$^2$ is a fluoroalkyl group. In one embodiment, R$^1$ is an alkyl group and R$^2$ is a fluoroalkyl group. In one embodiment, R$^1$ is a fluoroalkyl group and R$^2$ is an alkyl group. In one embodiment, R$^1$ is a fluoroalkyl group and R$^2$ is a fluoroalkyl group, and R$^1$ and R$^2$ can be either the same as or different from each other. In one embodiment, R$^1$ comprises one carbon atom. In one embodiment, R$^1$ comprises two carbon atoms.

In another embodiment, R$^1$ and R$^2$ are as defined herein above, and R$^1$ and R$^2$, taken as a pair, comprise at least two carbon atoms but not more than seven carbon atoms and further comprise at least two fluorine atoms, with the proviso that neither R$^1$ nor R$^2$ contains a FCH$_2$— group or a —FCH— group.

In one embodiment, the number of carbon atoms in R$^1$ in the formula above is 1, 3, 4, or 5.

In another embodiment, the number of carbon atoms in R$^1$ in the formula above is 1.

Examples of suitable fluorinated acyclic carboxylic acid esters include without limitation CH$_3$—COO—CH$_2$CF$_2$H (2,2-difluoroethyl acetate, CAS No. 1550-44-3), CH$_3$—COO—CH$_2$CF$_3$ (2,2,2-trifluoroethyl acetate, CAS No. 406-95-1), CH$_3$CH$_2$—COO—CH$_2$CF$_2$H (2,2-difluoroethyl propionate, CAS No. 1133129-90-4), CH$_3$—COO—CH$_2$CH$_2$CF$_2$H (3,3-difluoropropyl acetate), CH$_3$CH$_2$—COO—CH$_2$CH$_2$CF$_2$H (3,3-difluoropropyl propionate), F$_2$CHCH$_2$—COO—CH$_3$, F$_2$CHCH$_2$—COO—CH$_2$CH$_3$, and F$_2$CHCH$_2$CH$_2$—COO—CH$_2$CH$_3$ (ethyl 4,4-difluorobutanoate, CAS No. 1240725-43-2), H—COO—CH$_2$CF$_2$H (difluoroethyl formate, CAS No. 1137875-58-1), H—COO—CH$_2$CF$_3$ (trifluoroethyl formate, CAS No. 32042-38-9), and mixtures thereof. In one embodiment, the fluorinated acyclic carboxylic acid ester comprises 2,2-difluoroethyl acetate (CH$_3$—COO—CH$_2$CF$_2$H). In one embodiment, the fluorinated acyclic carboxylic acid ester comprises 2,2-difluoroethyl propionate (CH$_3$CH$_2$—COO—CH$_2$CF$_2$H). In one embodiment, the fluorinated acyclic carboxylic acid ester comprises 2,2,2-trifluoroethyl acetate (CH$_3$—COO—CH$_2$CF$_3$). In one embodiment, the fluorinated acyclic carboxylic acid ester comprises 2,2-difluoroethyl formate (H—COO—CH$_2$CF$_2$H).

In one embodiment, suitable fluorinated acyclic carbonates are represented by the formula R$^3$—OCOO—R$^4$, where R$^3$ and R$^4$ independently represent a linear or branched alkyl group, the sum of carbon atoms in R$^3$ and R$^4$ is 2 to 7, at least two hydrogens in R$^3$ and/or R$^4$ are replaced by fluorines (that is, at least two hydrogens in R$^3$ are replaced by fluorines, or at least two hydrogens in R$^4$ are replaced by fluorines, or at least two hydrogens in R$^3$ and at least two hydrogens in R$^4$ are replaced by fluorines), and neither R$^3$ nor R$^4$ contains a FCH$_2$ or FCH group.

In another embodiment, suitable fluorinated acyclic carbonates are represented by the formula

R$^3$—OCOO—R$^4$ wherein
i) R$^3$ is a fluoroalkyl group;
ii) R$^4$ is an alkyl group or a fluoroalkyl group; and
iii) R$^3$ and R$^4$ taken as a pair comprise at least two carbon atoms but not more than seven carbon atoms.

In one embodiment, R$^3$ is a fluoroalkyl group and R$^4$ is an alkyl group. In one embodiment, R$^3$ is a fluoroalkyl group and R$^4$ is a fluoroalkyl group, and R$^3$ and R$^4$ can be either the same as or different from each other. In one embodiment, R$^3$ comprises one carbon atom. In one embodiment, R$^3$ comprises two carbon atoms.

In another embodiment, R$^3$ and R$^4$ are as defined herein above, and R$^3$ and R$^4$, taken as a pair, comprise at least two carbon atoms but not more than seven carbon atoms and further comprise at least two fluorine atoms, with the proviso that neither R$^3$ nor R$^4$ contains a FCH$_2$— group or a —FCH— group.

Examples of suitable fluorinated acyclic carbonates include without limitation CH$_3$—OC(O)O—CH$_2$CF$_2$H (methyl 2,2-difluoroethyl carbonate, CAS No. 916678-13-2), CH$_3$—OC(O)O—CH$_2$CF$_3$ (methyl 2,2,2-trifluoroethyl carbonate, CAS No. 156783-95-8), CH$_3$—OC(O)O—CH$_2$CF$_2$CF$_2$H (methyl 2,2,3,3-tetrafluoropropyl carbonate, CAS No. 156783-98-1), HCF$_2$CH$_2$—OCOO—CH$_2$CH$_3$ (ethyl 2,2-difluoroethyl carbonate, CAS No. 916678-14-3), and CF$_3$CH$_2$—OCOO—CH$_2$CH$_3$ (ethyl 2,2,2-trifluoroethyl carbonate, CAS No. 156783-96-9).

In one embodiment, suitable fluorinated acyclic ethers are represented by the formula: R$^5$—O—R$^6$, where R$^5$ and R$^6$ independently represent a linear or branched alkyl group, the sum of carbon atoms in $R^5$ and $R^6$ is 2 to 7, at least two hydrogens in $R^5$ and/or $R^6$ (that is, at least two hydrogens in $R^5$ are replaced by fluorines, or at least two hydrogens in $R^6$ are replaced by fluorines, or at least two hydrogens in $R^5$ are replaced by fluorines and at least two hydrogens in $R^6$ are replaced by fluorines), are replaced by fluorines and neither $R^5$ nor $R^6$ contains a $FCH_2$ or FCH group.

In another embodiment, suitable fluorinated acyclic ethers are represented by the formula $$R^5\text{—}O\text{—}R^6$$

wherein
i) $R^5$ is a fluoroalkyl group;
ii) $R^6$ is an alkyl group or a fluoroalkyl group; and
iii) $R^5$ and $R^6$ taken as a pair comprise at least two carbon atoms but not more than seven carbon atoms.

In one embodiment, $R^5$ is a fluoroalkyl group and $R^6$ is an alkyl group. In one embodiment, $R^5$ is a fluoroalkyl group and $R^6$ is a fluoroalkyl group, and $R^5$ and $R^6$ can be either the same as or different from each other. In one embodiment, $R^5$ comprises one carbon atom. In one embodiment, $R^5$ comprises two carbon atoms.

In another embodiment, $R^5$ and $R^6$ are as defined herein above, and $R^5$ and $R^6$, taken as a pair, comprise at least two carbon atoms but not more than seven carbon atoms and further comprise at least two fluorine atoms, with the proviso that neither $R^5$ nor $R^6$ contains a $FCH_2$— group or a —FCH— group.

Examples of suitable fluorinated acyclic ethers include without limitation $HCF_2CF_2CH_2$—O—$CF_2CF_2H$ (CAS No. 16627-68-2) and $HCF_2CH_2$—O—$CF_2CF_2H$ (CAS No. 50807-77-7).

The fluorinated solvent may comprise a fluorinated acyclic carboxylic acid ester, a fluorinated acyclic carbonate, a fluorinated acyclic ether, or mixtures thereof. As used herein, the term "mixtures thereof" encompasses both mixtures within and mixtures between solvent classes, for example mixtures of two or more fluorinated acyclic carboxylic acid esters, and also mixtures of fluorinated acyclic carboxylic acid esters and fluorinated acyclic carbonates, for example. Non-limiting examples include a mixture of 2,2-difluoroethyl acetate and 2,2-difluoroethyl propionate; and a mixture of 2,2-difluoroethyl acetate and 2,2 difluoroethyl methyl carbonate.

In one embodiment, the fluorinated solvent is:
a) a fluorinated acyclic carboxylic acid ester represented by the formula:

$$R^1\text{—}COO\text{—}R^2,$$

b) a fluorinated acyclic carbonate represented by the formula:

$$R^3\text{—}OCOO\text{—}R^4,$$

c) a fluorinated acyclic ether represented by the formula:

$$R^5\text{—}O\text{—}R^6,$$

or a mixture thereof;
wherein
i) $R^1$ is H, an alkyl group, or a fluoroalkyl group;
ii) $R^3$ and $R^5$ is each independently a fluoroalkyl group and can be either the same as or different from each other;
iii) $R^2$, $R^4$, and $R^6$ is each independently an alkyl group or a fluoroalkyl group and can be either the same as or different from each other;
iv) either or both of $R^1$ and $R^2$ comprises fluorine; and
v) $R^1$ and $R^2$, $R^3$ and $R^4$, and $R^5$ and $R^6$, each taken as a pair, comprise at least two carbon atoms but not more than seven carbon atoms.

In another embodiment, the fluorinated solvent is
a) a fluorinated acyclic carboxylic acid ester represented by the Formula:

$$R^1\text{—}COO\text{—}R^2,$$

b) b) a fluorinated acyclic carbonate represented by the Formula:

$$R^3\text{—}OCOO\text{—}R^4,$$

c) a fluorinated acyclic ether represented by the Formula:

$$R^5\text{—}O\text{—}R^6,$$

or mixtures thereof;
wherein
i) $R^1$ is H, an alkyl group, or a fluoroalkyl group;
ii) $R^3$ and $R^5$ is each independently a fluoroalkyl group and can be either the same as or different from each other;
iii) $R^2$, $R^4$, and $R^6$ is each independently an alkyl group or a fluoroalkyl group and can be either the same as or different from each other;
iv) either or both of $R^1$ and $R^2$ comprises fluorine; and
v) $R^1$ and $R^2$, $R^3$ and $R^4$, and $R^5$ and $R^6$, each taken as a pair, comprise at least two carbon atoms but not more than seven carbon atoms and further comprise at least two fluorine atoms, with the proviso that none of $R^1$, $R^2$, $R^3$, $R^4$, $R^5$, nor $R^6$ contains a $FCH_2$— group or a —FCH— group.

In another embodiment, $R^1$ and $R^3$ in the formula above do not contain fluorine, and $R^2$ and $R^4$ contain fluorine.

In the electrolyte compositions disclosed herein, the fluorinated solvent or mixtures thereof can be used in various amounts depending on the desired properties of the electrolyte composition. In one embodiment, the fluorinated solvent comprises about 5% to about 95% by weight of the electrolyte composition. In another embodiment, the fluorinated solvent comprises about 10% to about 80% by weight of the electrolyte composition. In another embodiment, the fluorinated solvent comprises about 30% to about 70% by weight of the electrolyte composition. In another embodiment, the fluorinated solvent comprises about 50% to about 70% by weight of the electrolyte composition. In another embodiment, the fluorinated solvent comprises about 45% to about 65% by weight of the electrolyte composition. In another embodiment, the fluorinated solvent comprises about 6% to about 30% by weight of the electrolyte composition. In another embodiment, the fluorinated solvent comprises about 60% to about 65% by weight of the electrolyte composition. In another embodiment, the fluorinated solvent comprises about 20% to about 45% by weight of the electrolyte composition.

Fluorinated acyclic carboxylic acid esters, fluorinated acyclic carbonates, and fluorinated acyclic ethers suitable for use herein may be prepared using known methods. For example, acetyl chloride may be reacted with 2,2-difluoroethanol (with or without a basic catalyst) to form 2,2-difluoroethyl acetate. Additionally, 2,2-difluoroethyl acetate and 2,2-difluoroethyl propionate may be prepared using the method described by Wiesenhofer et al. (WO 2009/040367 A1, Example 5). Alternatively, 2,2-difluoroethyl acetate can be prepared using the method described in the Examples herein below. Other fluorinated acyclic carboxylic acid esters may be prepared using the same method using different starting carboxylate salts. Similarly, methyl chloroformate may be reacted with 2,2-difluoroethanol to form methyl 2,2-difluoroethyl carbonate. Synthesis of $HCF_2CF_2CH_2$—O—$CF_2CF_2H$ can be done by reacting 2,2, 3,3-tetrafluoropropanol with tetrafluoroethylene in the presence of base (e.g., NaH, etc.). Similarly, reaction of 2,2-difluoroethanol with tetrafluoroethylene yields $HCF_2CH_2$—$O$—$CF_2CF_2H$. Alternatively, some of these fluorinated solvents may be purchased from companies such as Matrix Scientific (Columbia S.C.). For best results, it is desirable to purify the fluorinated acyclic carboxylic esters and fluorinated acyclic carbonates to a purity level of at least about 99.9%, more particularly at least about 99.99%. These fluorinated solvents may be purified using distillation methods such as vacuum distillation or spinning band distillation.

The electrolyte composition may further comprise one or more organic carbonates, which can be fluorinated or non-fluorinated, linear or cyclic. Suitable organic carbonates can include, for example: fluoroethylene carbonate, which is also known as 4-fluoro-1,3-dioxolan-2-one, all isomers of trifluoroethylene carbonate; ethylene carbonate, also known as 1,3-dioxalan-2-one; ethyl methyl carbonate; all isomers of difluoroethylene carbonate including 4,5-difluoro-1,3-dioxolan-2-one; 4,5-difluoro-4-methyl-1,3-dioxolan-2-one; 4,5-difluoro-4,5-dimethyl-1,3-dioxolan-2-one; 4,4-difluoro-1,3-dioxolan-2-one; 4,4,5-trifluoro-1,3-dioxolan-2-one; tetrafluoroethylene carbonate; dimethyl carbonate; diethyl carbonate; propylene carbonate; vinylene carbonate; di-tert-butyl carbonate; 2,2,3,3-tetrafluoropropyl methyl carbonate; bis(2,2,3,3-tetrafluoropropyl) carbonate; bis(2,2,2-trifluoroethyl) carbonate; 2,2,2-trifluoroethyl methyl carbonate; bis(2,2-difluoroethyl) carbonate; 2,2-difluoroethyl methyl carbonate; dipropyl carbonate; methyl propyl carbonate; ethyl propyl vinylene carbonate; methyl butyl carbonate; ethyl butyl carbonate; propyl butyl carbonate; dibutyl carbonate; vinyl ethylene carbonate; dimethylvinylene carbonate; 2,3,3-trifluoroallyl methyl carbonate; or mixtures thereof. It is desirable to use a carbonate that is battery grade or has a purity level of at least about 99.9%, for example at least about 99.99%. Organic carbonates are available commercially or may be prepared by methods known in the art.

In some embodiments, the electrolyte composition further comprises a cyclic carbonate. In one embodiment, the cyclic carbonate comprises fluoroethylene carbonate. In one embodiment, the cyclic carbonate comprises ethylene carbonate. In one embodiment, the cyclic carbonate comprises propylene carbonate. In one embodiment, the cyclic carbonate comprises fluoroethylene carbonate and ethylene carbonate. In one embodiment, the cyclic carbonate comprises fluoroethylene carbonate and propylene carbonate.

The one or more organic carbonates can be used in various amounts depending on the desired properties of the electrolyte composition. In one embodiment, the one or more organic carbonate is present in the electrolyte composition in the range of from about 0.5% to about 95% by weight of the electrolyte composition, or about 5% to about 95%, or about 10% to about 80% by weight of the electrolyte composition, or about 20% to about 40% by weight of the electrolyte composition, or about 25% to about 35% by weight of the electrolyte composition. In another embodiment, the organic carbonate(s) comprises about 0.5% to about 10% by weight of the electrolyte composition, or about 1% to about 10%, or about 5% to about 10%. In other embodiments, the one or more organic carbonate is present in the electrolyte composition in a percentage by weight range that is defined by a lower limit and an upper limit. The lower limit of the range is 0.5, 1, 1.5, 2, 3, 4, 5, 6, 7, 8, 9, 10, 11, 12, 13, 14, 15, 16, 17, 18, 19, 20, 21, 22, 23, 24, or 25 and the upper limit of the range is 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95. All percentages by weight are based on the total weight of the electrolyte composition.

Optionally, an electrolyte composition as described herein may further comprise an additive such as a lithium boron compound, a cyclic sultone, a cyclic sulfate, a cyclic carboxylic acid anhydride, or a combination thereof.

In some embodiments, the electrolyte composition further comprises a lithium boron compound. Suitable lithium boron compounds include lithium terafluoroborate, lithium bis(oxalato)borate, lithium difluoro(oxalato)borate, other lithium boron salts, $Li_2B_{12}F_{12-x}H_x$, wherein x is 0 to 8, mixtures of lithium fluoride and anion receptors such as $B(OC_6F_5)_3$, or mixtures thereof. In one embodiment, the electrolyte composition additionally comprises at least one lithium borate salt selected from lithium bis(oxalato)borate, lithium difluoro(oxalato)borate, lithium tetrafluoroborate, or mixtures thereof. In some embodiments, the electrolyte composition comprises lithium bis(oxalato)borate. In some embodiments, the electrolyte composition comprises lithium difluoro(oxalato)borate. In some embodiments, the electrolyte composition comprises lithium tetrafluoroborate. The lithium borate salt may be present in the electrolyte composition in the range of from 0.1 to about 10 percent by weight, based on the total weight of the electrolyte composition, for example in the range of from 0.1 to about 5.0 percent by weight, or from 0.3 to about 4.0 percent by weight, or from 0.5 to 2.0 percent by weight. The lithium boron compounds can be obtained commercially or prepared by methods known in the art.

In some embodiments, the electrolyte composition further comprises a cyclic sultone. Suitable sultones include those represented by the formula:

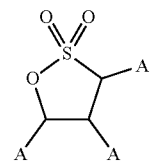

wherein each A is independently a hydrogen, fluorine, or an optionally fluorinated alkyl, vinyl, allyl, acetylenic, or propargyl group. The vinyl ($H_2C$=$CH$—), allyl ($H_2C$=$CH$—$CH_2$—), acetylenic ($HC$≡$C$—), or propargyl ($HC$≡$C$—$CH_2$—) groups may each be unsubstituted or partially or totally fluorinated. Each A can be the same or different as one or more of the other A groups, and two or three of the A groups can together form a ring. Mixtures of two or more of sultones may also be used. Suitable sultones include 1,3-propane sultone, 3-fluoro-1,3-propane sultone, 4-fluoro-1,3-propane sultone, 5-fluoro-1,3-propane sultone, and 1,8-naphthalenesultone. In one embodiment, the sultone comprises 1,3-propane sultone. In one embodiment, the sultone comprises 3-fluoro-1,3-propane sultone.

In one embodiment the sultone is present at about 0.01 to about 10 weight percent, or about 0.1 weight percent to about 5 weight percent, or about 0.5 weight percent to about 3 weight percent, or about 1 weight percent to about 3 weight percent or about 1.5 weight percent to about 2.5 weight percent, or about 2 weight percent, of the total electrolyte composition.

In some embodiments, the electrolyte composition further comprises a cyclic sulfate represented by the formula:

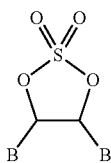

wherein each B is independently a hydrogen or an optionally fluorinated vinyl, allyl, acetylenic, propargyl, or $C_1$-$C_3$ alkyl group. The vinyl ($H_2C$=CH—), allyl ($H_2C$=CH—$CH_2$—), acetylenic (HC≡C—), propargyl (HC≡C—$CH_2$—), or $C_1$-$C_3$ alkyl groups may each be unsubstituted or partially or totally fluorinated. Mixtures of two or more of cyclic sulfates may also be used. Suitable cyclic sulfates include ethylene sulfate (1,3,2-dioxathiolane, 2,2-dioxide), 1,3,2-dioxathiolane, 4-ethynyl-, 2,2-dioxide, 1,3,2-dioxathiolane, 4-ethenyl-, 2,2-dioxide, 1,3,2-dioxathiolane, diethenyl-, 2,2-dioxide, 1,3, 2-dioxathiolane, 4-methyl-, 2,2-dioxide, and 1,3,2-dioxathiolane, 4,5-dimethyl-, 2,2-dioxide. In one embodiment, the cyclic sulfate is ethylene sulfate. In one embodiment the cyclic sulfate is present at about 0.1 weight percent to about 12 weight percent of the total electrolyte composition, or about 0.5 weight percent to less than about 10 weight percent, about 0.5 weight percent to less than about 5 weight percent, or about 0.5 weight percent to about 3 weight percent, or about 0.5 weight percent to about 2 weight percent, or about 2 weight percent to about 3 weight percent. In one embodiment the cyclic sulfate is present at about 1 weight percent to about 3 weight percent or about 1.5 weight percent to about 2.5 weight percent, or about 2 weight percent of the total electrolyte composition.

In some embodiments, the electrolyte composition further comprises a cyclic carboxylic acid anhydride. Suitable cyclic carboxylic acid anhydrides include those selected from the group consisting of the compounds represented by Formula (IV) through Formula (XI):

IV
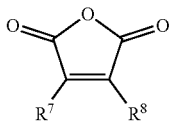

V
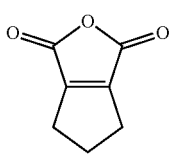

VI
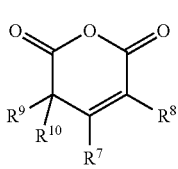

VII
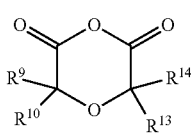

VIII
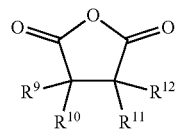

IX
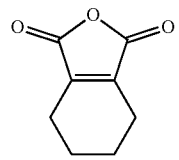

X
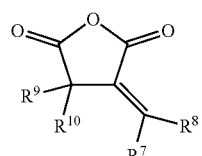

XI
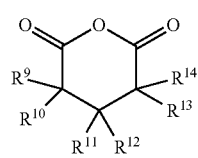

wherein $R^7$ to $R^{14}$ is each independently H, F, a linear or branched $C_1$ to $C_{10}$ alkyl radical optionally substituted with F, alkoxy, and/or thioalkyl substituents, a linear or branched $C_2$ to $C_{10}$ alkene radical, or a $C_6$ to $C_{10}$ aryl radical. The alkoxy substituents can have from one to ten carbons and can be linear or branched; examples of alkoxy substituents include —$OCH_3$, —$OCH_2CH_3$, and —$OCH_2CH_2CH_3$. The thioalkyl substituents can have from one to ten carbons and can be linear or branched; examples of thioalkyl substituents include —$SCH_3$, —$SCH_2CH_3$, and —$SCH_2CH_2CH_3$.

Examples of suitable cyclic carboxylic acid anhydrides include maleic anhydride; succinic anhydride; glutaric anhydride; 2,3-dimethylmaleic anhydride; citraconic anhydride; 1-cyclopentene-1,2-dicarboxylic anhydride; 2,3-diphenylmaleic anhydride; 3,4,5,6-tetrahydrophthalic anhydride; 2,3-dihydro-1,4-dithiiono-[2,3-c] furan-5,7-dione; and phenylmaleic anhydride. A mixture of two or more of these cyclic carboxylic acid anhydrides can also be used. In one embodiment, the cyclic carboxylic acid anhydride comprises maleic anhydride. In one embodiment, the cyclic carboxylic acid anhydride comprises maleic anhydride, succinic anhydride, glutaric anhydride, 2,3-dimethylmaleic anhydride, citraconic anhydride, or mixtures thereof. Cyclic carboxylic acid anhydrides can be obtained from a specialty chemical company such as Sigma-Aldrich, Inc. (Milwaukee, Wis.), or prepared using methods known in the art. It is desirable to purify the cyclic carboxylic acid anhydride to a purity level of at least about 99.0%, for example at least about 99.9%. Purification can be done using methods known in the art.

In some embodiments, the electrolyte composition comprises about 0.1 weight percent to about 5 weight percent of the cyclic carboxylic acid anhydride, based on the total weight of the electrolyte composition. In some embodiments, the cyclic carboxylic acid anhydride is present in the electrolyte composition in a percentage by weight that is defined by a lower limit and an upper limit. The lower limit of the range is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5 and the upper limit of the range is 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0. All percentages by weight are based on the total weight of the electrolyte composition.

In one embodiment, the electrolyte composition comprises 2,2-difluoroethyl acetate, ethylene carbonate, and at least one silyl oxalate. In one embodiment, the electrolyte composition comprises 2,2-difluoroethyl acetate, propylene carbonate, and at least one silyl oxalate. In one embodiment, the electrolyte composition comprises 2,2-difluoroethyl acetate, fluoroethylene carbonate, and at least one silyl oxalate. In one embodiment, the electrolyte composition comprises 2,2-difluoroethyl acetate, ethylene carbonate, fluoroethylene carbonate, and at least one silyl oxalate. In one embodiment, the electrolyte composition comprises 2,2-difluoroethyl acetate, propylene carbonate, fluoroethylene carbonate, and at least one silyl oxalate.

In one embodiment, the electrolyte composition comprises 2,2-difluoroethyl methyl carbonate, ethylene carbonate, and at least one silyl oxalate. In one embodiment, the electrolyte composition comprises 2,2-difluoroethyl methyl carbonate, propylene carbonate, and at least one silyl oxalate. In one embodiment, the electrolyte composition comprises 2,2-difluoroethyl methyl carbonate, fluoroethylene carbonate, and at least one silyl oxalate. In one embodiment, the electrolyte composition comprises 2,2-difluoroethyl methyl carbonate, ethylene carbonate, fluoroethylene carbonate, and at least one silyl oxalate. In one embodiment, the electrolyte composition comprises 2,2-difluoroethyl methyl carbonate, propylene carbonate, fluoroethylene carbonate, and at least one silyl oxalate.

In one embodiment, the electrolyte composition comprises 2,2-difluoroethylacetate, an organic carbonate, and dimethylsilyl oxalate. In one embodiment, the electrolyte composition comprises 2,2-difluoroethylacetate, an organic carbonate, and methylvinylsilyl oxalate. In one embodiment, the electrolyte composition comprises 2,2-difluoroethylacetate, an organic carbonate, and vinylphenylsilyl oxalate. In one embodiment, the electrolyte composition comprises 2,2-difluoroethylacetate, an organic carbonate, and diphenylsilyl oxalate.

In one embodiment, the electrolyte composition comprises 2,2-difluoroethyl methyl carbonate, an organic carbonate, and dimethylsilyl oxalate. In one embodiment, the electrolyte composition comprises 2,2-difluoroethyl methyl carbonate, an organic carbonate, and methylvinylsilyl oxalate. In one embodiment, the electrolyte composition comprises 2,2-difluoroethyl methyl carbonate, an organic carbonate, and vinylphenylsilyl oxalate. In one embodiment, the electrolyte composition comprises 2,2-difluoroethyl methyl carbonate, an organic carbonate, and diphenylsilyl oxalate.

Optionally, the electrolyte compositions disclosed herein can further comprise additives that are known to those of ordinary skill in the art to be useful in conventional electrolyte compositions, particularly for use in lithium ion batteries. For example, electrolyte compositions disclosed herein can also include gas-reduction additives which are useful for reducing the amount of gas generated during charging and discharging of lithium ion batteries. Gas-reduction additives can be used in any effective amount, but can be included to comprise from about 0.05 weight % to about 10 weight %, alternatively from about 0.05 weight % to about 5 weight % of the electrolyte composition, or alternatively from about 0.5 weight % to about 2 weight % of the electrolyte composition.

Suitable gas-reduction additives that are known conventionally are, for example: halobenzenes such as fluorobenzene, chlorobenzene, bromobenzene, iodobenzene, or haloalkylbenzenes; 1,3-propane sultone; succinic anhydride; ethynyl sulfonyl benzene; 2-sulfobenzoic acid cyclic anhydride; divinyl sulfone; triphenylphosphate (TPP); diphenyl monobutyl phosphate (DMP); γ-butyrolactone; 2,3-dichloro-1,4-naphthoquinone; 1,2-naphthoquinone; 2,3-dibromo-1,4-naphthoquinone; 3-bromo-1,2-naphthoquinone; 2-acetylfuran; 2-acetyl-5-methylfuran; 2-methyl imidazolel-(phenylsulfonyl)pyrrole; 2,3-benzofuran; fluoro-cyclotriphosphazenes such as 2,4,6-trifluoro-2-phenoxy-4,6-dipropoxy-cyclotriphosphazene and 2,4,6-trifluoro-2-(3-(trifluoromethyl)phenoxy)-6-ethoxy-cyclotriphosphazene; benzotriazole; perfluoroethylene carbonate; anisole; diethylphosphonate; fluoroalkyl-substituted dioxolanes such as 2-trifluoromethyldioxolane and 2,2-bistrifluoromethyl-1,3-dioxolane; trimethylene borate; dihydro-3-hydroxy-4,5,5-trimethyl-2(3H)-furanone; dihydro-2-methoxy-5,5-dimethyl-3(2H)-furanone; dihydro-5,5-dimethyl-2,3-furandione; propene sultone; diglycolic acid anhydride; di-2-propynyl oxalate; 4-hydroxy-3-pentenoic acid γ-lactone; $CF_3COOCH_2C(CH_3)(CH_2OCOCF_3)_2$; $CF_3COOCH_2CF_2CF_2CF_2CH_2OCOCF_3$; α-methylene-γ-butyrolactone; 3-methyl-2(5H)-furanone; 5,6-dihydro-2-pyranone; diethylene glycol, diacetate; triethylene glycol dimethacrylate; triglycol diacetate; 1,2-ethanedisulfonic anhydride; 1,3-propanedisulfonic anhydride; 2,2,7,7-tetraoxide 1,2,7-oxadithiepane; 3-methyl-, 2,2,5,5-tetraoxide 1,2,5-oxadithiolane; hexamethoxycyclotrip hosphazene; 4,5-dimethyl-4,5-difluoro-1,3-dioxolan-2-one; 2-ethoxy-2,4,4,6,6-pentafluoro-2,2,4,4,6,6-hexahydro-1,3,5,2,4,6-triazatriphosphorine; 2,2,4,4,6-pentafluoro-2,2,4,4,6,6-hexahydro-6-methoxy-1,3,5,2,4,6-triazatriphosphorine; 4,5-Difluoro-1,3-dioxolan-2-one; 1,4-bis(ethenylsulfonyl)-butane; bis(vinylsulfonyl)-methane; 1,3-bis(ethenylsulfonyl)-propane; 1,2-bis(ethenylsulfonyl)-ethane; ethylene carbonate; diethyl carbonate; dimethyl carbonate; ethyl methyl carbonate; and 1,1'-[oxybis(methylenesulfonyl)]bis-ethene.

Other suitable additives that can be used are HF scavengers, such as silanes, silazanes (Si—NH—Si), epoxides, amines, aziridines (containing two carbons), salts of carbonic acid lithium oxalate, $B_2O_5$, ZnO, and fluorinated inorganic salts.

In another embodiment, there is provided herein an electrochemical cell comprising a housing, an anode and a cathode disposed in the housing and in ionically conductive contact with one another, an electrolyte composition, as described herein above providing an ionically conductive pathway between the anode and the cathode, and a porous or microporous separator between the anode and the cathode. In some embodiments, the electrochemical cell is a lithium ion battery.

The housing may be any suitable container to house the electrochemical cell components. Housing materials are well-known in the art and can include, for example, metal and polymeric housings. While the shape of the housing is not particularly important, suitable housings can be fabricated in the shape of a small or large cylinder, a prismatic case, or a pouch. The anode and the cathode may be comprised of any suitable conducting material depending on the type of electrochemical cell. Suitable examples of anode materials include without limitation lithium metal, lithium metal alloys, lithium titanate, aluminum, platinum, palladium, graphite, transition metal oxides, and lithiated tin oxide. Suitable examples of cathode materials include without limitation graphite, aluminum, platinum, palladium, electroactive transition metal oxides comprising lithium or sodium, indium tin oxide, and conducting polymers such as polypyrrole and polyvinylferrocene.

The porous separator serves to prevent short circuiting between the anode and the cathode. The porous separator typically consists of a single-ply or multi-ply sheet of a microporous polymer such as polyethylene, polypropylene, polyamide, polyimide or a combination thereof. The pore size of the porous separator is sufficiently large to permit transport of ions to provide ionically conductive contact between the anode and the cathode, but small enough to prevent contact of the anode and cathode either directly or from particle penetration or dendrites which can form on the anode and cathode. Examples of porous separators suitable for use herein are disclosed in U.S. application Ser. No. 12/963,927 (filed 9 Dec. 2010, U.S. Patent Application Publication No. 2012/0149852, now U.S. Pat. No. 8,518,525).

Many different types of materials are known that can function as the anode or the cathode. In some embodiments, the cathode can include, for example, cathode electroactive materials comprising lithium and transition metals, such as $LiCoO_2$, $LiNiO_2$, $LiMn_2O_4$, $LiCo_{0.2}Ni_{0.2}O_2$, $LiV_3O_8$, $LiNi_{0.5}Mn_{1.5}O_4$; $LiFePO_4$, $LiMnPO_4$, $LiCoPO_4$, and $LiVPO_4F$. In other embodiments, the cathode active materials can include, for example:

$Li_aCoG_bO_2$ ($0.90 \leq a \leq 1.8$, and $0.001 \leq b \leq 0.1$);

$Li_aNi_bMn_cCo_dR_eO_{2-f}Z_f$ where $0.8 \leq a \leq 1.2$, $0.1 \leq b \leq 0.9$, $0.0 \leq c \leq 0.7$, $0.05 \leq d \leq 0.4$, $0 \leq e \leq 0.2$, wherein the sum of b+c+d+e is about 1, and $0 \leq f \leq 0.08$;

$Li_aA_{1-b}R_bD_2$ ($0.90 \leq a \leq 1.8$ and $0 \leq b \leq 0.5$);

$Li_aE_{1-b}R_bO_{2-c}D_c$ ($0.90 \leq a \leq 1.8$, $0 \leq b \leq 0.5$ and $0 \leq c \leq 0.05$);

$Li_aNi_{1-b-c}Co_bR_cO_{2-d}Z_d$ where $0.9 \leq a \leq 1.8$, $0 \leq b \leq 0.4$, $0 \leq c \leq 0.05$, and $0 \leq d \leq 0.05$;

$Li_{1+z}Ni_{1-x-y}Co_xAl_yO_2$ where $0<x<0.3$, $0<y<0.1$, and $0<z<0.06$.

In the above chemical formulas A is Ni, Co, Mn, or a combination thereof; D is O, F, S, P, or a combination thereof; E is Co, Mn, or a combination thereof; G is Al, Cr, Mn, Fe, Mg, La, Ce, Sr, V, or a combination thereof; R is Al, Ni, Co, Mn, Cr, Fe, Mg, Sr, V, Zr, Ti, a rare earth element, or a combination thereof; Z is F, S, P, or a combination thereof. Suitable cathodes include those disclosed in U.S. Pat. Nos. 5,962,166; 6,680,145; 6,964,828; 7,026,070; 7,078,128; 7,303,840; 7,381,496; 7,468,223; 7,541,114; 7,718,319; 7,981,544; 8,389,160; 8,394,534; and 8,535,832, and the references therein. By "rare earth element" is meant the lanthanide elements from La to Lu, and Y and Sc.

In another embodiment the cathode material is an NMC cathode; that is, a LiNiMnCoO cathode, more specifically, cathodes in which the atomic ratio of Ni:Mn:Co is 1:1:1 ($Li_aNi_{1-b-c}Co_bR_cO_{2-d}Z_d$ where $0.98 \leq a \leq 1.05$, $0 \leq d \leq 0.05$, b=0.333, c=0.333, where R comprises Mn) or where the atomic ratio of Ni:Mn:Co is 5:3:2 ($Li_aNi_{1-b-c}Co_bR_cO_{2-d}Z_d$ where $0.98 \leq a \leq 1.05$, $0 \leq d \leq 0.05$, c=0.3, b=0.2, where R comprises Mn).

In another embodiment, the cathode comprises a material of the formula $Li_aMn_bJ_cO_4Z_d$, wherein J is Ni, Co, Mn, Cr, Fe, Cu, V, Ti, Zr, Mo, B, Al, Ga, Si, Li, Mg, Ca, Sr, Zn, Sn, a rare earth element, or a combination thereof; Z is F, S, P, or a combination thereof; and $0.9 \leq a \leq 1.2$, $1.3 \leq b \leq 2.2$, $0 \leq c \leq 0.7$, $0 \leq d \leq 0.4$.

In another embodiment, the cathode in the electrochemical cell or lithium ion battery disclosed herein comprises a cathode active material exhibiting greater than 30 mAh/g capacity in the potential range greater than 4.6 V versus a $Li/Li^+$ reference electrode. One example of such a cathode is a stabilized manganese cathode comprising a lithium-containing manganese composite oxide having a spinel structure as cathode active material. The lithium-containing manganese composite oxide in a cathode suitable for use herein comprises oxides of the formula $Li_xNi_yM_zMn_{2-y-z}O_{4-d}$, wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18; and d is 0 to 0.3. In one embodiment in the above formula, y is 0.38 to 0.48, z is 0.03 to 0.12, and d is 0 to 0.1. In one embodiment in the above formula, M is one or more of Li, Cr, Fe, Co and Ga. Stabilized manganese cathodes may also comprise spinel-layered composites which contain a manganese-containing spinel component and a lithium rich layered structure, as described in U.S. Pat. No. 7,303,840.

In another embodiment, the cathode comprises a composite material represented by the structure of Formula:

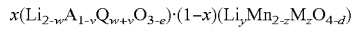
$x(Li_{2-w}A_{1-v}Q_{w+v}O_{3-e}) \cdot (1-x)(Li_yMn_{2-z}M_zO_{4-d})$ wherein:
x is about 0.005 to about 0.1;
A comprises one or more of Mn or Ti;
Q comprises one or more of Al, Ca, Co, Cr, Cu, Fe, Ga, Mg, Nb, Ni, Ti, V, Zn, Zr or Y;
e is 0 to about 0.3;
v is 0 to about 0.5.
w is 0 to about 0.6;
M comprises one or more of Al, Ca, Co, Cr, Cu, Fe, Ga, Li, Mg, Mn, Nb, Ni, Si, Ti, V, Zn, Zr or Y;
d is 0 to about 0.5;
y is about 0 to about 1; and
z is about 0.3 to about 1; and
wherein the $Li_yMn_{2-z}M_zO_{4-d}$ component has a spinel structure and the $Li_{2-w}Q_{w+v}A_{1-v}O_{3-e}$ component has a layered structure.

In another embodiment, in the Formula

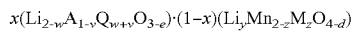
$x(Li_{2-w}A_{1-v}Q_{w+v}O_{3-e}) \cdot (1-x)(Li_yMn_{2-z}M_zO_{4-d})$ x is about 0 to about 0.1, and all ranges for the other variables are as stated herein above.

In another embodiment, the cathode in the lithium ion battery disclosed herein comprises

$Li_aA_{1-x}R_xDO_{4-f}Z_f$, wherein:
A is Fe, Mn, Ni, Co, V, or a combination thereof;
R is Al, Ni, Co, Mn, Cr, Fe, Mg, Sr, V, Zr, Ti, a rare earth element, or a combination thereof;
D is P, S, Si, or a combination thereof;
Z is F, Cl, S, or a combination thereof;
$0.8 \leq a \leq 2.2$;
$0 \leq x \leq 0.3$; and
$0 \leq f \leq 0.1$.

In another embodiment, the cathode in the lithium ion battery ore electrochemical cell disclosed herein comprises a cathode active material which is charged to a potential greater than or equal to about 4.1 V, or greater than or equal to 4.35 V, or greater than 4.5 V, or greater than or equal to 4.6 V versus a $Li/Li^+$ reference electrode. Other examples are layered-layered high-capacity oxygen-release cathodes such as those described in U.S. Pat. No. 7,468,223 charged to upper charging potentials above 4.5 V.

In some embodiments, the cathode comprises a cathode active material exhibiting greater than 30 mAh/g capacity in the potential range greater than 4.6 V versus a $Li/Li^+$ reference electrode, or a cathode active material which is charged to a potential greater than or equal to 4.35 V versus a Li/Li+ reference electrode.

A cathode active material suitable for use herein can be prepared using methods such as the hydroxide precursor method described by Liu et al (*J. Phys. Chem. C* 13:15073-15079, 2009). In that method, hydroxide precursors are precipitated from a solution containing the required amounts of manganese, nickel and other desired metal(s) acetates by the addition of KOH. The resulting precipitate is oven-dried and then fired with the required amount of LiOH.H$_2$O at about 800 to about 1000° C. in oxygen for 3 to 24 hours. Alternatively, the cathode active material can be prepared using a solid phase reaction process or a sol-gel process as described in U.S. Pat. No. 5,738,957 (Amine).

A cathode, in which the cathode active material is contained, suitable for use herein may be prepared by methods such as mixing an effective amount of the cathode active material (e.g. about 70 wt % to about 97 wt %), a polymer binder, such as polyvinylidene difluoride, and conductive carbon in a suitable solvent, such as N-methylpyrrolidone, to generate a paste, which is then coated onto a current collector such as aluminum foil, and dried to form the cathode.

An electrochemical cell or lithium ion battery as disclosed herein further contains an anode, which comprises an anode active material that is capable of storing and releasing lithium ions. Examples of suitable anode active materials include, for example, lithium alloys such as lithium-aluminum alloy, lithium-lead alloy, lithium-silicon alloy, and lithium-tin alloy; carbon materials such as graphite and mesocarbon microbeads (MCMB); phosphorus-containing materials such as black phosphorus, MnP$_4$ and CoP$_3$; metal oxides such as SnO$_2$, SnO and TiO$_2$; nanocomposites containing antimony or tin, for example nanocomposites containing antimony, oxides of aluminum, titanium, or molybdenum, and carbon, such as those described by Yoon et al (*Chem. Mater.* 21, 3898-3904, 2009); and lithium titanates such as Li$_4$Ti$_5$O$_{12}$ and LiTi$_2$O$_4$. In one embodiment, the anode active material is lithium titanate or graphite. In another embodiment, the anode is graphite.

An anode can be made by a method similar to that described above for a cathode wherein, for example, a binder such as a vinyl fluoride-based copolymer is dissolved or dispersed in an organic solvent or water, which is then mixed with the active, conductive material to obtain a paste. The paste is coated onto a metal foil, preferably aluminum or copper foil, to be used as the current collector. The paste is dried, preferably with heat, so that the active mass is bonded to the current collector. Suitable anode active materials and anodes are available commercially from companies such as Hitachi, NEI Inc. (Somerset, N.J.), and Farasis Energy Inc. (Hayward, Calif.).

The electrochemical cell as disclosed herein can be used in a variety of applications. For example, the electrochemical cell can be used for grid storage or as a power source in various electronically powered or assisted devices ("Electronic Device") such as a computer, a camera, a radio, a power tool, a telecommunications device, or a transportation device (including a motor vehicle, automobile, truck, bus or airplane). The present disclosure also relates to an electronic device, a transportation device, or a telecommunication device comprising the disclosed electrochemical cell. In another embodiment, there is provided a method for forming an electrolyte composition. The method comprises combining a) a fluorinated solvent; b) at least one silyl oxalate represented by Formula I as disclosed herein, and c) LiPF$_6$ to form the electrolyte composition. The components can be combined in any suitable order. The step of combining can be accomplished by adding the individual components of the electrolyte composition sequentially or at the same time. In some embodiments, the components a) and b) are combined to make a first solution. After the formation of the first solution, an amount of the LiPF$_6$ is added to the first solution in order to produce the electrolyte composition having the desired concentration of LiPF$_6$. Alternatively, the components a) and c) are combined to make a first solution, and after the formation of the first solution an amount of the at least one silyl oxalate is added to produce the electrolyte composition. Typically, the electrolyte composition is stirred during and/or after the addition of the components in order to form a homogeneous mixture.

In yet another embodiment, there is provided a method for forming an electrolyte composition comprising a lithium oxalato phosphate salt represented by the formula LiPF$_{(6-2q)}$(C$_2$O$_4$)$_q$ wherein q is 1, 2 or 3. The method comprises combining a) a fluorinated solvent; b) at least one silyl oxalate represented by Formula I as disclosed herein, and c) LiPF$_6$ to form the electrolyte composition. The components can be combined in any suitable order. The step of combining can be accomplished by adding the individual components of the electrolyte composition sequentially or at the same time. In some embodiments, the components a) and b) are combined to make a first solution. After the formation of the first solution, an amount of the LiPF$_6$ is added to the first solution in order to produce the electrolyte composition having the desired concentration of LiPF$_6$. Alternatively, the components a) and c) are combined to make a first solution, and after the formation of the first solution an amount of the at least one silyl oxalate is added to produce the electrolyte composition. Typically, the electrolyte composition is stirred during and/or after the addition of the components in order to form a homogeneous mixture; optionally, heat may be applied. As the LiPF$_6$ and the silyl oxalate react, an electrolyte composition comprising a lithium oxalato phosphate is formed.

In another embodiment, a method for improving the cycling performance of a lithium ion battery is disclosed, the method comprising the step of incorporating a silyl oxalate salt as described by Formula I in the electrolyte composition as described herein.

EXAMPLES

The concepts disclosed herein are illustrated in the following Examples, which are not intended to be used or interpreted as a limitation of the scope of the claims unless this intention is expressly stated. From the above discussion and these Examples, one skilled in the art can ascertain the essential characteristics of the concepts disclosed herein, and without departing from the spirit and scope thereof, can make various changes and modifications to adapt to various uses and conditions.

The meaning of abbreviations used is as follows: "° C." means degrees Celsius; "g" means gram(s), "mg" means milligram(s), "μg" means microgram(s), "L" means liter(s), "mL" means milliliter(s), "μL" means microliter(s), "mol" means mole(s), "mmol" means millimole(s), "M" means molar concentration, "wt %" means percent by weight, "mm" means millimeter(s), "μm" means micrometer(s), "ppm" means parts per million, "h" means hour(s), "min" means minute(s), "psig" means pounds per square inch gauge, "kPa" means kiloPascal(s), "A" means amperes, "mA" mean milliampere(s), "mAh/g" mean milliamperes hour(s) per gram, "V" means volt(s), "xC" refers to a constant current which is the product of x and a current in A which is numerically equal to the nominal capacity of the battery expressed in Ah, "rpm" means revolutions per minute, "NMR" means nuclear magnetic resonance spectroscopy, "GC/MS" means gas chromatography/mass spectrometry, "Ex" means Example and "Comp. Ex" means Comparative Example.

Materials and Methods

Oxalic acid, 1,2-dichloroethane, chlorotrimethylsilane, and dichlorodimethyldisilane were obtained from Aldrich (Milwaukee, Wis.).

Representative Preparation of 2,2-difluoroethyl acetate (DFEA)

The 2,2-difluoroethyl acetate used in the Examples and Comparative Examples was prepared by reacting potassium acetate with $HCF_2CH_2Br$. The following is a typical procedure used for the preparation.

Potassium acetate (Aldrich, Milwaukee, Wis., 99%) was dried at 100° C. under a vacuum of 0.5-1 mm of Hg (66.7-133 Pa) for 4 to 5 h. The dried material had a water content of less than 5 ppm, as determined by Karl Fischer titration. In a dry box, 212 g (2.16 mol, 8 mol % excess) of the dried potassium acetate was placed into a 1.0-L, 3 neck round bottom flask containing a heavy magnetic stir bar. The flask was removed from the dry box, transferred into a fume hood, and equipped with a thermocouple well, a dry-ice condenser, and an additional funnel.

Sulfolane (500 mL, Aldrich, 99%, 600 ppm of water as determined by Karl Fischer titration) was melted and added to the 3 neck round bottom flask as a liquid under a flow of nitrogen. Agitation was started and the temperature of the reaction medium was brought to about 100° C. $HCF_2CH_2Br$ (290 g, 2 mol, E.I. du Pont de Nemours and Co., 99%) was placed in the addition funnel and was slowly added to the reaction medium. The addition was mildly exothermic and the temperature of the reaction medium rose to 120-130° C. in 15-20 min after the start of the addition. The addition of $HCF_2CH_2Br$ was kept at a rate which maintained the internal temperature at 125-135° C. The addition took about 2-3 h. The reaction medium was agitated at 120-130° C. for an additional 6 h (typically the conversion of bromide at this point was about 90-95%). Then, the reaction medium was cooled down to room temperature and was agitated overnight. Next morning, heating was resumed for another 8 h.

At this point the starting bromide was not detectable by NMR and the crude reaction medium contained 0.2-0.5% of 1,1-difluoroethanol. The dry-ice condenser on the reaction flask was replaced by a hose adapter with a Teflon® valve and the flask was connected to a mechanical vacuum pump through a cold trap (−78° C., dry-ice/acetone). The reaction product was transferred into the cold trap at 40-50° C. under a vacuum of 1-2 mm Hg (133 to 266 Pa). The transfer took about 4-5 h and resulted in 220-240 g of crude $HCF_2CH_2OC(O)CH_3$ of about 98-98.5% purity, which was contaminated by a small amount of $HCF_2CH_2Br$ (about 0.1-0.2%), $HCF_2CH_2OH$ (0.2-0.8%), sulfolane (about 0.3-0.5%) and water (600-800 ppm). Further purification of the crude product was carried out using spinning band distillation at atmospheric pressure. The fraction having a boiling point between 106.5-106.7° C. was collected and the impurity profile was monitored using GC/MS (capillary column HP5MS, phenyl-methyl siloxane, Agilent 19091 S-433, 30 m, 250 μm, 0.25 μm; carrier gas—He, flow rate 1 mL/min; temperature program: 40° C., 4 min, temp. ramp 30° C./min, 230° C., 20 min). Typically, the distillation of 240 g of crude product gave about 120 g of $HCF_2CH_2OC(O)CH_3$ of 99.89% purity, (250-300 ppm $H_2O$) and 80 g of material of 99.91% purity (containing about 280 ppm of water). Water was removed from the distilled product by treatment with 3 A molecular sieves, until water was not detectable by Karl Fischer titration (i.e., <1 ppm).

Synthesis of Dimethylsilyl Oxalate

Dimethylsilyl oxalate, a silyl oxalate of Formula I wherein R and R' are each methyl, was prepared according to the following procedure. A 500 mL multi-neck flask fitted with a condenser, thermocouple, septum, and gas inlet/bubbler was purged with nitrogen and then charged with 10.75 g (0.119 mol) oxalic acid and 150 mL of dry 1,2-dichloroethane. The slurry was stirred and 18.30 g dichlorodimethylsilane (0.142 mol, 1.2 equiv) was added by syringe. The septum was replaced with a glass stopper and the mixture heated to 69° C. After 3 days the temperature was increased to gentle reflux (82° C.). Heating was continued for another day, whereupon all of the solids dissolved to give a clear, colorless solution. The nitrogen purge exiting the bubbler was neutral to moistened pH paper, indicating HCl evolution was complete. Upon cooling to room temperature colorless crystals were obtained. The crystals were isolated by filtration and dried under vacuum. Yield: 14.0 g, 80%.

Single crystal x-ray diffraction confirmed the assigned structure.

A sample (4 g) of this product was further purified by sublimation at 90° C., 0.05 torr.

$^1$H NMR (d6-DMSO): d 0.250 (s).

$^{13}$C{$^1$H} NMR (d6-DMSO): d 158.9, 3.9.

Synthesis of Methylvinylsilyl Oxalate

Methylvinylsilyl oxalate, a silyl oxalate of Formula I wherein R is methyl and R' is vinyl, was prepared according to the following procedure. A 500 mL multi-neck flask fitted with a condenser, thermocouple, septum, and gas inlet/bubbler was purged with nitrogen and then charged with 14.91 g (0.166 mol) oxalic acid and 100 mL of dry 1,2-dichloroethane. The slurry was stirred and 26.10 g of dichlorovinylmethylsilane (0.185 mol, 1.2 equiv) was added by syringe. The septum was replaced with a glass stopper and the mixture heated to reflux at 105° C. for approximately four days. The nitrogen purge exiting the bubbler was neutral to moistened pH paper, indicating HCl evolution was complete. Upon cooling to room temperature, off-white powder was obtained. The powder was isolated by removing the excess solvent under vacuum. The powder was purified by sublimation at 100° C. and 50 millitorr.

Synthesis of Bis(Trimethylsilyl) Oxalate

Bis(trimethylsilyl) oxalate, a silyl oxalate of Formula II wherein R, R', and R" are each methyl, was prepared from chlorotrimethylsilane and oxalic acid in 1,2-dichloroethane as described in: Green, M. D.; Schreiner, C.; Long, T. E., J. Phys. Chem. A, 2011, 115, 13829-13835.

Preparation of Lithium Trisoxalatophosphate (LiTOP)

The LiTOP used in Comparative Example H below was prepared according to the following method. Anhydrous oxalic acid (25.0 g; 0.278 mol; mw=90.03; Aldrich 194131) was stirred under vacuum (0.3 torr) at 110° C. for 25 min in a 250-mL RB. Sublimated oxalic acid was scraped off the sides of the flask and anhydrous diethyl ether (40 mL) was added to the dried oxalic acid with magnetic stirring (500 rpm) under nitrogen. Phosphorus pentachloride (17.0 g; 0.082 mol; mw=208.34; Aldrich 157775) was added in 4-g portions over 1 hr. When all the $PCl_5$ had been added, an additional 5 mL of ether was used to rinse $PCl_5$ off the walls of the flask. The reaction mixture, a clear solution, was stirred at reflux in a 45° C. water bath for 1 hr and then allowed to cool and stir at ambient temperature overnight. The opaque white suspension was stirred in a 60° C. water bath under a nitrogen stream to remove ether, leaving a pale yellow solid cake. The flask was transferred to the glove box (all subsequent operations were done in the glove box), and the solids were broken up and held under high vacuum for 2 hr to remove ether. The solids were stirred with 50 mL diethyl ether and the slurry was suction-filtered. The solids were washed with 100 mL ether in 3 portions and were dried under high vacuum at RT for 2 hr to yield 28.9 g (79%) of trisoxalatophosphoric acid dietherate.

A slurry of 24.4 g (55 mmol) the dietherate obtained above and 55 mL of ether was magnetically stirred at RT in a 250-mL RB flask as 0.8 g lithium hydride (100 mmol; mw=7.95; Aldrich 201049) was added in 0.1-g portions (foaming) over 30 min. Then 10 mL more ether was added, and the flask was stoppered, removed from the glove box, fitted with a condenser and stirred at reflux under nitrogen in a 60° C. oil bath for 5 hr; after 2 hr 15 mL more ether was added to thin the suspension. The flask was cooled and returned to the glove box and the mixture was rotovapped to dryness at RT. The white, powdery solids were stirred with 50 mL anhydrous diethyl carbonate (DEC; Aldrich 517135) at RT; H NMR of the supernatent showed the absence of an acidic proton at 16 ppm. The suspension was suction-filtered through a medium frit to leave 1 g gray solids (contains LiH). The clear tan filtrate was magnetically stirred under high vacuum with warming over the hotplate set at 100 (surface temp 80° C.) for 30 min during which time the solution became viscous but remained stirrable. The heat was turned off as stirring under vacuum continued for another 30 min, during which time the mixture set up to a stiff white semi-solid mass, about the consistency of drywall spackle. The material was suction-filtered through a medium frit to remove about 5 mL DEC and the damp cake was dispersed in 20 mL methyl t-butyl ether (MTBE; Aldrich 443808) and suction-filtered damp. The product stood in the funnel (no suction) in the glove box over the weekend, during which time it became dry. It was suspended again in 20 mL more MTBE and suction-filtered dry to yield 7.9 g as a fine white powder. The powder was stirred with 20 mL electrolyte grade ethyl methyl carbonate and gravity-filtered through a coarse frit to remove 1.6 g white solids; the clear filtrate was stirred under high vacuum to yield 5.0 g LiTOP.

Example 1, Comparative Example A, and Comparative Example B

The capacity retention in coin cells fabricated with an electrolyte composition comprising silyl oxalates was determined and compared with the capacity retention in coin cells containing an electrolyte composition without silyl oxalates.

Cathode Preparation

The following is a typical procedure used to prepare the cathodes used in Example 1 and Comparative Examples A and B. The binder is prepared as a 5% solution of polyvinylidene fluoride (Solef™ 5130 (Solvay, Houston, Tex.)) in N-methylpyrrolidone (Sigma-Aldrich). The following materials were used to make an electrode paste: 9.36 g $LiNi_{0.5}Mn_{0.3}Co_{0.2}O_2$ cathode active powder; 0.52 g carbon black (Super C65 (Timcal)); 10.4 g PVDF (polyvinylidene difluoride) solution and 3.0 g NMP (Sigma Aldrich). The materials were combined in a ratio of 90:5:5, cathode active powder:PVDF:carbon black, as described below.

The carbon black, the additional portion of NMP, and the PVdF solution were combined in a vial and centrifugally mixed (ARE-310, Thinky USA, Inc., Laguna Hills, Calif.) two times, for 60 s at 2000 rpm each time. The cathode active powder was added and the paste was centrifugally mixed two times (2×1 min at 2000 rpm). The rotor-stator shaft of a homogenizer (model PT 10-35 GT, 7.5 mm diameter stator, Kinematicia, Bohemia, N.Y.) was inserted into the vial and the resulting paste was homogenized for 5 min each at 9500 rpm. The paste was then degassed by centrifugal mixing for 1 min at 2000 rpm.

The paste was cast using doctor blades with a 0.290 mm gate height onto aluminum foil (25 μm thick, 1145-0, Allfoils, Brooklyn Heights, Ohio) using an automatic coater (AFA-II, MTI Corp., Richmond, Calif.). The electrodes were dried in a mechanical convection oven (model FDL-115, Binder Inc., Great River, N.Y.) with a temperature ramp and hold starting with a 15 min ramp from 80° C.-100° C., followed by a hold at 100° C. The cathodes were placed between 0.5 mm thick stainless steel sheets and passed through a calender three times using 100 mm diameter steel rolls at 125° C. with nip forces increasing on each of the passes, starting at 9 psig and ending with 30 psig on the final pass.

Loadings of cathode active material were 14.8 mg/cm$^2$.

Anode Preparation

The following is a typical procedure used for the preparation of the anodes used in Example 1 and Comparative Examples A and B herein. An anode paste was prepared from the following materials: 6.2062 g graphite (CPreme® G5, Conoco-Philips, Houston, Tex.); 0.3406 g carbon black (Super C65, Timcal, Westlake, Ohio); 3.7975 g PVDF (13% in NMP. KFL #9130, Kureha America Corp.); 13.0974 g 1-methyl-2-pyrrolidinone (NMP); and 0.0119 g oxalic acid. The materials were combined in a ratio of 88:0.17:7:4.83, graphite:oxalicacid:PVDF:carbon black, as described below. The final paste contained 29.4% solids.

Oxalic acid, carbon black, half of the NMP, and PVDF solution were combined in a plastic vial. The materials were mixed for 60 s at 2000 rpm using a planetary centrifugal mixer. The mixing was repeated a second time. The graphite was then added along with the remaining NMP. The resulting paste was centrifugally mixed two times. The vial was homogenized using a rotor-stator for 5 min at 10000 rpm, adjusting the vial's location throughout the mixing. The vial was then remixed for 60 s at 2000 rpm.

The paste was cast using a doctor blade with a 290 μm gate height on to copper foil (CF-LBX-10, Fukuda, Kyoto, Japan) using the automatic coater. The electrodes were dried for 30 min at 95° C. in the mechanical convection oven. The resulting 102-mm wide anodes were placed between 390 μm thick stainless steel sheets layered with a sheet of Kapton and passed through a calender four times using 100 mm diameter steel rolls held at 125° C. with nip forces increasing and the film's entry direction shifted 180° in each of the passes, starting at 340 kg with the final pass at 1130 kg.

Loadings of anode active material were approximately 8.4 mg/cm$^2$.

Electrolyte Preparation

The electrolyte composition for Comparative Example B was prepared by combining 70 weight percent of 2,2-difluoroethyl acetate and 30 weight percent ethylene carbonate (EC, BASF, Independence, Ohio) in a nitrogen purged drybox. Molecular sieves (3 A) were added and the mixture was dried to less than 1 ppm water. After filtration with a 0.25 micron PTFE syringe filter, sufficient LiPF$_6$ (lithium hexafluorophosphate, BASF, Independence, Ohio) was added to make the formulation 1 M in LiPF$_6$. 1.96 g of this mixture was combined with 0.04 g of bis(trimethylsilyl) oxalate, prepared as described above, to make the final electrolyte composition. Upon mixing, a hazy solution was obtained, and the subsequent mixture was filtered through a 0.2 micron PTFE syringe filter before addition to the coin cells.

The electrolyte composition for Example 1 was prepared by combining 70 weight percent of 2,2-difluoroethyl acetate and 30 weight percent ethylene carbonate (EC, BASF, Independence, Ohio) in a nitrogen purged drybox. Molecular sieves (3 A) were added and the mixture was dried to less than 1 ppm water. After filtration with a 0.25 micron PTFE syringe filter, sufficient LiPF$_6$ (lithium hexafluorophosphate, BASF, Independence, Ohio) was added to make the formulation 1 M in LiPF$_6$. 1.96 g of this mixture was combined with 0.04 g of dimethylsilyl oxalate, prepared as described above, to make the final electrolyte composition.

Comparative Example A used an electrolyte composition containing 2,2-difluoroethyl acetate (70 wt %), ethylene carbonate (30 wt %), and LiPF$_6$. The electrolyte composition did not contain any silyl oxalate. The electrolyte composition was prepared by combining 70 weight percent of 2,2-difluoroethyl acetate and 30 weight percent ethylene carbonate (EC, BASF, Independence, Ohio) in a nitrogen purged drybox. Molecular sieves (3 A) were added and the mixture was dried to less than 1 ppm water. After filtration with a 0.2 micron PTFE syringe filter, sufficient LiPF$_6$ (lithium hexafluorophosphate, BASF, Independence, Ohio) was added to make the formulation 1 M in LiPF$_6$.

Coin Cell Fabrication

Circular anodes 14.3 mm diameter and cathodes 12.7 mm diameter were punched out from the electrode sheets described above, placed in a heater in the antechamber of a glove box (Vacuum Atmospheres, Hawthorne, Calif., with HE-493 purifier), further dried under vacuum overnight at 90° C., and brought into an argon-filled glove box. Non-aqueous electrolyte lithium-ion CR2032 coin cells were prepared for electrochemical evaluation. The coin cell parts (case, spacers, wave spring, gasket, and lid) and coin cell crimper were obtained from Hohsen Corp (Osaka, Japan). The separator was a Celgard 2500 (Celgard/Polypore International, Charlotte, N.C.).

Coin Cell Formation at 25° C.

Each of the electrolyte compositions of Example 1 and Comparative Examples A and B were used to fabricate three coin cells, for a total of nine cells. The coin cells were initially charged at a 0.25 C rate for 36 min, followed by a 12 hour rest. The first charge was then continued up to 4.35V with a constant voltage hold cutting off at C/20, followed by a rest for 10 min, and then discharge at 0.5 C down to 3.0V. The second cycle consisted of a 10 min rest followed by a 0.2 C rate charge up to 4.35V, with a hold at 4.35V and cutoff of 0.05 C rate. A 10 min rest followed, and then a 0.2 C rate discharge to 3.0V. The formation procedure was performed using a commercial battery tester (Series 4000, Maccor, Tulsa, Okla.) at ambient temperature.

Coin Cell Evaluations at 45° C.

Following the formation procedure, the cells were placed in an oven at 45° C. and cycled using constant current charging and discharging between voltage limits of 3.0-4.35 V using a repeating protocol of 19 cycles at a current of 170 mA per gram of cathode active material, which is approximately a 1 C rate, followed by 1 cycle at a current of 34 mA/g, which is approximately a 0.2 C rate.

The discharge capacity retention at 50 cycles at 45° C. is shown in Table 1.

TABLE 1

Capacity Retention from Coin Cell Cycling Data for Comparative Example A, Comparative Example B, and Example 1

| Example | Silyl Oxalate and Amount | Coin Cell | Capacity Retention at 50 Cycles (%) | Average Capacity Retention at 50 Cycle (%) | Coulombic Efficiency at Cycle 50 (%) | Average Coulombic Efficiency at Cycle 50 (%) |
|---|---|---|---|---|---|---|
| Comp. Ex. A | none | A-1 | 37.3 | 30.0 | 94.3 | 95.2 |
| | | A-2 | 33.0 | | 96.8 | |
| | | A-3 | 19.5 | | 94.5 | |
| Comp. Ex. B | 2 wt % bis(trimethylsilyl) oxalate | B-1 | 70.1 | 65.6 | 99.2 | 98.9 |
| | | B-2 | 69.6 | | 99.1 | |
| | | B-3 | 57.1 | | 98.3 | |
| Ex. 1 | 2 wt % dimethylsilyl oxalate | 1-1 | 76.0 | 79.9 | 99.7 | 99.7 |
| | | 1-2 | 79.9 | | 99.6 | |
| | | 1-3 | 83.9 | | 99.7 | |

Table 1 shows the superior electrochemical performance for the coin cells with the electrolyte compositions of Example 1, which contained a silyl oxalate additive, as compared to that of the Comparative Example A and Comparative Example B coin cells, for which the electrolyte composition contained the same solvent mixture but no silyl oxalate additive, as shown by the higher values for "average coulombic efficiency at cycle 50".

Comparative Example C

For Comparative Example C, the cathodes and anodes were prepared as described for Comparative Example B.

The electrolyte composition for Comparative Example C was prepared as described for Comparative Example B, with the exception that a clear solution was obtained and no additional filtering was performed after adding the bis (trimethylsilyl) oxalate.

Three coin cells were fabricated as for Comparative Example B, using the electrolyte composition of Comparative Example C. The same coin cell formation procedure was used as described for Comparative Example B.

Coin Cell Evaluations at 45° C.

Following the formation procedure, the cells were placed in an oven at 45° C. and cycled using constant current charging and discharging between voltage limits of 3.0-4.35 V using a repeating protocol of 24 cycles at a current of 170 mA per gram of cathode active material, which is approximately a 1 C rate, followed by 1 cycle at a current of 34 mA/g, which is approximately a 0.2 C rate.

The discharge capacity retention at 49 and 60 cycles at 45° C. is shown in Table 2.

TABLE 2

Capacity Retention from Coin Cell Cycling Data for Comparative Example c

| Example | Silyl Oxalate and Amount | Coin Cell | Capacity Retention at 49 Cycles (%) | Average Capacity Retention at 49 Cycles (%) | Coulombic Efficiency at Cycle 49 (%) | Average Coulombic Efficiency at Cycle 49 (%) |
|---|---|---|---|---|---|---|
| Comp Ex. C | 2 wt % bis(trimethylsilyl) oxalate | C-1<br>C-2<br>C-3 | 72.2<br>79.4<br>76.1 | 75.9 | 99.3<br>99.3<br>99.1 | 99.2 |

| | | Coin Cell | Capacity Retention at 60 Cycles (%) | Coulombic Efficiency at Cycle 60 (%) | Average Coulombic Efficiency at Cycle 60 (%) | Average Coulombic Efficiency at Cycle 60 (%) |
|---|---|---|---|---|---|---|
| | | C-1<br>C-2<br>C-3 | 70.3<br>77.4<br>73.6 | 73.7 | 99.3<br>99.4<br>99.1 | 73.7 |

Example 2, Comparative Example D Comparative Example E

Cathode Preparation

The cathode electrodes were prepared by the following procedure.

Preparation of Primer on Aluminum Foil Current Collector—Using a Polyimide/Carbon Composite The following is a typical procedure used for the preparation of primer on the aluminum foil current collector used in Example 2 and Comparative Examples D and E. To prepare the polyamic acid, a prepolymer was first prepared. 20.6 wt % of PMDA:ODA prepolymer was prepared using a stoichiometry of 0.98:1 PMDA/ODA (pyromellitic dianhydride//ODA (4,4'-diaminodiphenyl ether) prepolymer). This was prepared by dissolving ODA in N-methylpyrrolidone (NMP) over the course of approximately 45 minutes at room temperature with gentle agitation. PMDA powder was slowly added (in small aliquots) to the mixture to control any temperature rise in the solution; the addition of the PMDA was performed over approximately two hours. The addition and agitation of the resulting solution under controlled temperature conditions. The final concentration of the polyamic acid was 20.6 wt % and the molar ratio of the anhydride to the amine component was approximately 0.98:1.

In a separate container, a 6 wt % solution of pyromellitic anhydride (PMDA) was prepared by combining 1.00 g of PMDA (Aldrich 412287, Allentown, Pa.) and 15.67 g of NMP (N-methylpyrrolidone). 4.0 grams of the PMDA solution was slowly added to the prepolymer and the viscosity was increased to approximately 90,000 poise (as measured by a Brookfield viscometer—#6 spindle). This resulted in a finished prepolymer solution in which the calculated final PMDA:ODA ratio was 1.01:1. 5.196 grams of the finished prepolymer was then diluted with 15.09 grams of NMP to create a 5 wt % solution. In a vial, 16.2342 grams of the diluted finished prepolymer solution was added to 0.1838 grams of TimCal Super C-65 carbon black. This was further diluted with 9.561 grams of NMP for a final solids content of 3.4 wt %, with a 2.72 prepolymer: carbon ratio. A Paasche VL#3 Airbrush sprayer (Paasche Airbrush Company, Chicago, Ill.) was used to spray this material onto the aluminum foil (25 µm thick, 1145-0, Allfoils, Brooklyn Heights, Ohio).

The foil was weighed prior to spraying to identify the necessary coating to reach a desired density of 0.06 mg/cm$^2$. The foil was then smoothed onto a glass plate, and sprayed by hand with the airbrush until coated. The foil was then dried at 125° C. on a hot plate, and measured to ensure that the desired density was reached. The foil was found to be coated with 0.06 mg/cm$^2$ of the polyamic acid. Once the foil was dried and at the desired coating, the foil was imidized at 400° C. following the imidization procedure having the temperature profile below:

40° C. to 125° C. (ramp at 4° C./min)
125° C. to 125° C. (soak 30 min)
125° C. to 250° C. (ramp at 4° C./min)
250° C. to 250° C. (soak 30 min)
250° C. to 400° C. (ramp at 5° C./min)
400° C. to 400° C. (soak 20 min).

Coating of the Cathode Electroactive Layer onto the Primed Al Foil

The binder is prepared as a 5% solution of polyvinylidene fluoride (Solef™ 5130 (Solvay, Houston, Tex.)) in N-methylpyrrolidone (Sigma-Aldrich). The following materials were used to make an electrode paste: 9.36 g $LiNi_{0.5}Mn_{0.3}Co_{0.2}O_2$ cathode active powder; 0.52 g carbon black (Super C65 (Timcal)); 10.4 g PVDF (polyvinylidene difluoride) solution and 3.0 g NMP (Sigma Aldrich). The materials were combined in a ratio of 90:5:5, cathode active powder:PVDF:carbon black, as described below.

The carbon black, the additional portion of NMP, and the PVdF solution were combined in a vial and centrifugally mixed (ARE-310, Thinky USA, Inc., Laguna Hills, Calif.) two times, for 60 s at 2000 rpm each time. The cathode active powder was added and the paste was centrifugally mixed two times (2×1 min at 2000 rpm). The rotor-stator shaft of a homogenizer (model PT 10-35 GT, 7.5 mm diameter stator, Kinematicia, Bohemia, N.Y.) was inserted into the vial and the resulting paste was homogenized for 5 min each at 9500 rpm. The paste was then degassed by centrifugal mixing for 1 min at 2000 rpm.

The paste was cast using doctor blades with a 0.290 mm gate height onto aluminum foil (25 µm thick, 1145-0, Allfoils, Brooklyn Heights, Ohio) using an automatic coater (AFA-II, MTI Corp., Richmond, Calif.). The electrodes were dried in a mechanical convection oven (model FDL-115, Binder Inc., Great River, N.Y.) with a temperature ramp and hold starting with a 15 min ramp from 80° C.-100° C., followed by a hold at 100° C. The cathodes were placed between 0.5 mm thick stainless steel sheets and passed through a calender three times using 100 mm diameter steel rolls at 125° C. with nip forces increasing on each of the passes, starting at 9 psig and ending with 30 psig on the final pass.

Loadings of cathode active material were 14.8 mg/cm$^2$

Anodes were prepared as described for Example 1 and Comparative Example B. Loadings of anode active material were approximately 8.4 mg/cm$^2$.

Electrolyte Preparation

For Example 2, the electrolyte composition was prepared by combining 49.0758 g of 2,2-difluoroethyl acetate (DFEA) and 16.3632 g of fluoroethylene carbonate (FEC, BASF, Independence, Ohio) in a nitrogen purged drybox. Molecular sieves (3 A) were added and the mixture was dried to less than 1 ppm water. After filtration with a 0.25 micron PTFE syringe filter, 2.6540 g of the mixture was combined with 0.0414 g dimethylsilyl oxalate. 0.3413 g of LiPF$_6$ (lithium hexafluorophosphate, BASF, Independence, Ohio) was added to prepare the formulated electrolyte composition.

For Comparative Example D, the electrolyte composition was prepared by combining 49.0758 g of 2,2-difluoroethyl acetate and 16.3632 g fluoroethylene carbonate (FEC, BASF, Independence, Ohio) in a nitrogen purged drybox. Molecular sieves (3 A) were added and the mixture was dried to less than 1 ppm water. After filtration with a 0.25 micron PTFE syringe filter, 2.6638 g of the mixture was combined with 0.0644 g of bis(trimethylsilyl) oxalate. 0.3408 g of LiPF$_6$ (BASF, Independence, Ohio) was added to prepare the formulated electrolyte composition.

For Comparative Example E, the electrolyte composition was prepared by combining 13.3888 g of 2,2-difluoroethyl acetate and 4.4620 g fluoroethylene carbonate (FEC, BASF, Independence, Ohio) in a nitrogen purged drybox. Molecular sieves (3 A) were added and the mixture was dried to less than 1 ppm water. After filtration with a 0.25 micron PTFE syringe filter, 2.1135 g LiPF$_6$ (BASF, Independence, Ohio) was added to prepare the formulated electrolyte composition. No silyl oxalate was added.

Coin Cell Fabrication

Coin cells were fabricated as described for Example 1 and Comparative Example B. The electrolyte composition of Example 2 was used to fabricate three coin cells. The electrolyte composition of Comparative Example D was used to fabricate five coin cells, and the electrolyte composition of Comparative Example E was used to fabricate three coin cells.

Coin Cell Formation at 25° C.

The coin cells were initially charged at a 0.25 C rate for 36 min, followed by a 12 hour rest. The first charge was then continued up to 4.35 V at 0.25 C rate with a constant voltage hold cutting off at C/20, followed by a rest for 10 min, and then discharged at 0.5 C down to 3.0V. The second cycle consisted of a 10 min rest followed by a 0.2 C rate charge up to 4.35 V, with a hold at 4.35 V and cutoff of 0.05 C rate. A 10 min rest followed, and then a 0.2 C rate discharge to 3.0V. The formation procedure was performed using a commercial battery tester (Series 4000, Maccor, Tulsa, Okla.) at ambient temperature.

Coin Cell Evaluations at 45° C.

Following the formation procedure, the cells were placed in an oven at 45° C. and cycled using constant current charging and discharging between voltage limits of 3.0-4.35 V using a repeating protocol of 19 cycles at a current of 170 mA per gram of cathode active material, which is approximately a 1 C rate, followed by 1 cycle at a current of 34 mA/g, which is approximately a 0.2 C rate.

Results are presented in Table 3.

TABLE 3

Cycle Life Data From Coin Cell Cycling Data; 45° C. Evaluations Using Graphite:NMC 532 Cells Charged to 4.35 V

| Example | Electrolyte Composition | Coin Cell | Cycle Life 80% | Average Cycle Life 80% |
|---|---|---|---|---|
| 2 | 75/25 DFEA/FEC + 1.5 wt % dimethylsilyl oxalate | 2-1 | 311 | 280 |
|  |  | 2-2 | 263 |  |
|  |  | 2-3 | 267 |  |
| Comp. Ex. D | 75/25 DFEA/FEC + 2.1 wt % bis(trimethylsilyl) oxalate | D-1 | 340 | 277 |
|  |  | D-2 | 260 |  |
|  |  | D-3 | 232 |  |
|  |  | D-4 | 276 |  |
|  |  | D-5 | 275 |  |
| Comp. Ex. E | 75/25 DFEA/FEC | E-1 | 146 | 236 |
|  |  | E-2 | 304 |  |
|  |  | E-3 | 257 |  |

As shown by the higher "average cycle life 80%" values, coin cells using the electrolyte compositions of Example 2, which contained a silyl oxalate additive, showed superior electrochemical performance compared to that of coin cells with the electrolyte composition of Comparative Examples D and E, which used the same solvent mixture but no silyl oxalate additive.

Comparative Examples F, G, and H

For Comparative Examples F, G, and H, the cathode electrodes were prepared as for Example 2. Loadings of the cathode active material were 13.5 mg/cm$^2$ for Comparative Example F, 13.5 mg/cm$^2$ for Comparative Example G, and 12.76-13.05 mg/cm$^2$ for Comparative Example H.

Anodes were prepared as described for Example 1 and Comparative Example B. Loadings of anode active material were approximately 8.4 mg/cm$^2$.

Electrolyte Preparation

For Comparative Example F, the same electrolyte composition was used as described for Comparative Example E.

For Comparative Example G, the same electrolyte composition was used as for Comparative Example E.

For Comparative Example H, the electrolyte composition was prepared by combining 49.0758 g of 2,2-difluoroethyl acetate and 16.3632 g of fluoroethylene carbonate (FEC, BASF, Independence, Ohio) in a nitrogen purged drybox. Molecular sieves (3 A) were added and the mixture was dried to less than 2 ppm water. The solvent mixture was filtered using a 0.25 micron PTFE syringe filter. 2.6544 g of the mixture was combined with 0.0829 g of lithium tris (oxalato)phosphate (LiTOP) prepared as described herein above. 0.3436 g of LiPF$_6$ (BASF, Independence, Ohio) was added to prepare the formulated electrolyte composition.

Coin Cell Fabrication

Coin cells were fabricated as described for Example 1 and Comparative Example B. The electrolyte composition of Comparative Example F was used to fabricate three coin cells. The electrolyte composition of Comparative Example G was used to fabricate two coin cells, and the electrolyte composition of Comparative Example H was also used to fabricate two coin cells.

Coin Cell Formation at 25° C.

The same procedure as described in Example 2 was used, except an upper voltage of 4.5 V was used instead of 4.35 V. The cells were initially charged at a 0.25 C rate for 36 min, followed by a 12 hour rest. The first charge was then continued up to 4.50 V at 0.25 C rate with a constant voltage hold cutting off at C/20, followed by a rest for 10 min, and then discharged at 0.5 C down to 3.0V. The second cycle consisted of a 10 min rest followed by a 0.2 C rate charge up to 4.50 V, with a hold at 4.50 V and cutoff of 0.05 C rate. A 10 min rest followed, and then a 0.2 C rate discharge to 3.0V. The formation procedure was performed using a commercial battery tester (Series 4000, Maccor, Tulsa, Okla.) at ambient temperature.

Coin Cell Evaluations at 45° C.

Following the formation procedure, the cells were placed in an oven at 45° C. and cycled using constant current charging and discharging between voltage limits of 3.0-4.50 V using a repeating protocol of 19 cycles at a current of 213 mA per gram of cathode active material, which is approximately a 1 C rate, followed by 1 cycle at a current of 42.6 mA/g, which is approximately a 0.2 C rate.

Results are shown in Table 4. The term "Cycle Life 80%" is the number of cycles required to reduce the discharge capacity to 80% of its initial capacity at 45° C. All evaluations were performed at 45° C.

TABLE 4

Cycle Life Data from Coin Cell Cycling Data: 45° C. Evaluations Using Graphite:NMC 532 Cells Charged to 4.50 V

| Example | Electrolyte Composition | Coin Cell | Cycle Life 80% | Average Cycle Life 80% |
|---|---|---|---|---|
| Comp. Ex. F | 75/25 DFEA/FEC | F-1 | 148 | 142.3 |
| | | F-2 | 156 | |
| | | F-3 | 123 | |
| Comp. Ex. G | 75/25 DFEA/FEC + 2.1 wt % bis(trimethylsilyl) oxalate | G-1 | 313 | 244.5 |
| | | G-2 | 176 | |
| Comp. Ex. H | 75/25 DFEA/FEC + 2 wt % LiTOP | H-1 | 213 | 197.5 |
| | | H-2 | 182 | |

Example 3

Reaction of LiPF$_6$ with Dimethylsilyl Oxalate

This Example demonstrates formation of lithium phosphorus fluoro-oxalates and an organosilicon fluoride product when LiPF$_6$ and dimethylsilyl oxalate are combined in an approximate 5:1 molar ratio in solution at room temperature.

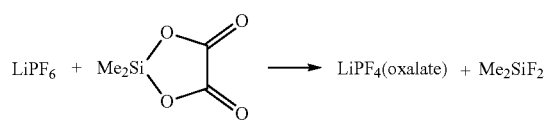

A vial was charged with 1.0 mL of a 1.0 M solution of LiPF$_6$ (1.0 mmole) in CH$_3$CO$_2$CH$_2$CF$_2$H. Dimethylsilyl oxalate (0.029 g, 0.2 mmol) was added. After 3 hours at ambient temperature, $^{19}$F NMR analysis showed the formation of LiPF$_4$(oxalate) and Me$_2$SiF$_2$.

$^{19}$F NMR (CD$_3$CN):
LiPF$_4$(ox): −59.2 ppm (m), −76.1 (m)
Me$_2$SiF$_2$: −132.6 (d, J=80.7 Hz)

Comparative Example I

Reaction of LiPF$_6$ with Bis(Trimethylsilyl) Oxalate

This Example demonstrates formation of lithium phosphorus fluoro-oxalates when LiPF$_6$ and a silyl oxalate of Formula II are combined at room temperature. The reaction also forms an organosilicon fluoride product.

A reaction vial was charged with 0.203 g (1.33 mmol) LiPF$_6$, 10.0 g anhydrous dimethylcarbonate, and 1.0 g (4.27 mmol, 3.2 equiv) bis(trimethylsilyl) oxalate, prepared as described above. The sample was warmed to 70° C. to give a colorless, slightly hazy solution. NMR ($^{31}$P and $^{19}$F) analysis after 4 hours showed the formation of a mixture of LiPF$_4$(ox), LiPF$_2$(ox)$_2$, and trimethylsilyl fluoride as shown in Reaction Scheme A, which is not balanced because the specific ratio of LiPF$_2$(ox)$_2$ and LiPF$_4$(ox) is unknown. No remaining LiPF$_6$ was observed. The abbreviation "ox" refers to the oxalate moiety (C$_2$O$_4$).

Reaction Scheme A

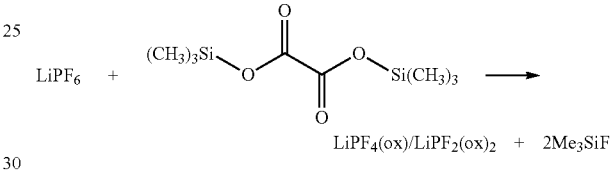

Heating the solution for an additional 24 hours resulted in complete conversion to LiPF$_2$(ox)$_2$, as shown in Reaction Scheme B, which is shown as a balanced reaction although the actual amounts of the species in solution were not quantified. No remaining LiPF$_4$(ox) was observed by NMR analysis.

Reaction Scheme B

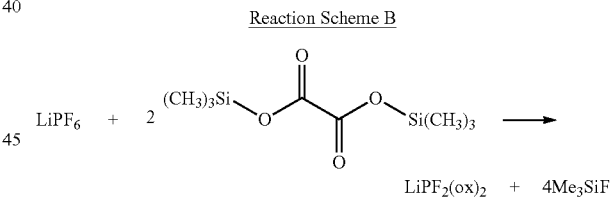

$^{31}$P and $^{19}$F NMR (CDCl$_3$/dimethyl carbonate) were used to characterize the reaction products:

$^{31}$P NMR: −141.9 ppm [t, J=806 Hz, LiPF$_2$(ox)$_2$], −141.4 [quint, LiPF$_4$(ox)].

$^{19}$F NMR: −59.9 ppm [dt, J=54.6, 7.68 Hz, LiPF$_4$(ox)], −63.3 [dt, J=405, 7.29 Hz, LiPF$_2$(ox)$_2$], −77.5 [dt, J=761, 54.6 Hz, LiPF$_4$(ox)], −158.6 (s, trimethylsilyl fluoride).

Comparative Example J

Electrode Characterization by X-ray Photoelectron Spectroscopy

In this Example, an cathode and anode of an Comparative Example D coin cell were analyzed by X-ray Photoelectron Spectroscopy (XPS) after the coin cell evaluation to determine if silicon from the silyl oxalate additive of the electrolyte composition was incorporated into the SEI layers on one or both of the electrodes, as evidenced by increased silicon content on either or both the cathode and anode surfaces.

The electrodes were obtained from coin cell D-5 of Comparative Example D after cycling as described herein above. Following the evaluation of the coin cell in the cycling experiment (after 80% capacity retention was reached), the cell was opened in an Argon filled drybox. The cell components were removed, separated, and lightly rinsed with dimethyl carbonate. The cathode and anode electrodes were dried in under vacuum for at least 12 hours prior to further analysis.

XPS surface and depth profile analyses were performed with a Physical Electronics Quantera Scanning XPS Microprobe, using a monochromatic Al X-ray (1486.6 eV) beam operated at 20 kV and 100 W. The X-ray beam was generated using an electron gun and scanned over ~1400 μm×~200 μm to define the analytical area. The take-off angle was 45° relative to the sample normal. Depth profiles were performed using 2 KeV Ar$^+$ ions with 4 mm×4 mm raster size. The calibrated SiO$_2$ sputter rate under this sputter condition was at 2.5 nm/min. PHI MultiPak® software version 9.0 was used for data analysis.

The XPS results from the anode and cathode surfaces are listed in Table 5. It is clear that silicon is present on both the anode and cathode surfaces after electrochemical cycling.

TABLE 5

Surface Concentrations of Elements Detected by XPS on the Anode and Cathode (in Atom %) for Coin Cell D-5 of Comparative Example D

|  | Li | C | N | O | F | Si | P | Mn | Co | Ni | S |
|---|---|---|---|---|---|---|---|---|---|---|---|
| Anode | 28.6 | 30.8 | ND | 25.8 | 10.0 | 2.7 | 2.1 | 0.1 | ND | ND | ND |
| Cathode | 4.6 | 53.9 | 0.4 | 23.3 | 14.6 | 0.9 | 1.9 | 0.2 | ND | 0.2 | <0.05 |

Notes:
The concentrations reported in Table 5 are normalized to 100%.
H and He cannot be detected by XPS.
ND = not detected by XPS with detection limit at ~0.1 atom %.

The XPS depth profile results of the anode are shown in FIG. 1. These results show that silicon is also present in the sub-surface region of the anode electrode interface.

Comparative Example K

Electrode characterization by X-ray Photoelectron Spectroscopy

In this Example, an cathode and anode of an Comparative Example G coin cell were analyzed by X-ray Photoelectron Spectroscopy (XPS) after the coin cell evaluation to determine if silicon from the silyl oxalate additive of the electrolyte composition was incorporated into the SEI layers on one or both of the electrodes, as evidenced by increased silicon content on either or both the cathode and anode surfaces.

The electrodes were obtained from coin cell G-1 of Comparative Example G after cycling as described herein above. Following the evaluation of the coin cell in the cycling experiment (after 80% capacity retention was reached), the cell was opened in an Argon filled drybox. The cell components were removed, separated, and lightly rinsed with dimethyl carbonate. The cathode and anode electrodes were dried in under vacuum for at least 12 hours prior to further analysis.

XPS surface and depth profile analyses were performed as described for Comparative Example J.

The XPS results from the anode and cathode surfaces are listed in Table 6. The XPS data indicates the silicon is present on both the anode and cathode electrode surfaces following electrochemical cycling.

TABLE 6

Surface Concentrations of Elements Detected by XPS on the Anode and Cathode (in Atom %) for Coin Cell G-1 of Comparative Example G

|  | Li | C | N | O | F | Si | P | Mn | Co | Ni | S |
|---|---|---|---|---|---|---|---|---|---|---|---|
| Anode | 13.2 | 38.9 | 0.1 | 24.4 | 18.6 | 0.5 | 4.0 | 0.1 | ND | 0.3 | ND |
| Cathode | 7.1 | 44.9 | 0.4 | 22.3 | 21.5 | 1.0 | 2.4 | 0.1 | ND | 0.3 | 0.1 |

Notes:
The concentrations reported in Table 6 are normalized to 100%.
H and He cannot be detected by XPS.
ND = not detected by XPS with detection limit at ~0.1 atom %.

Figure 2:
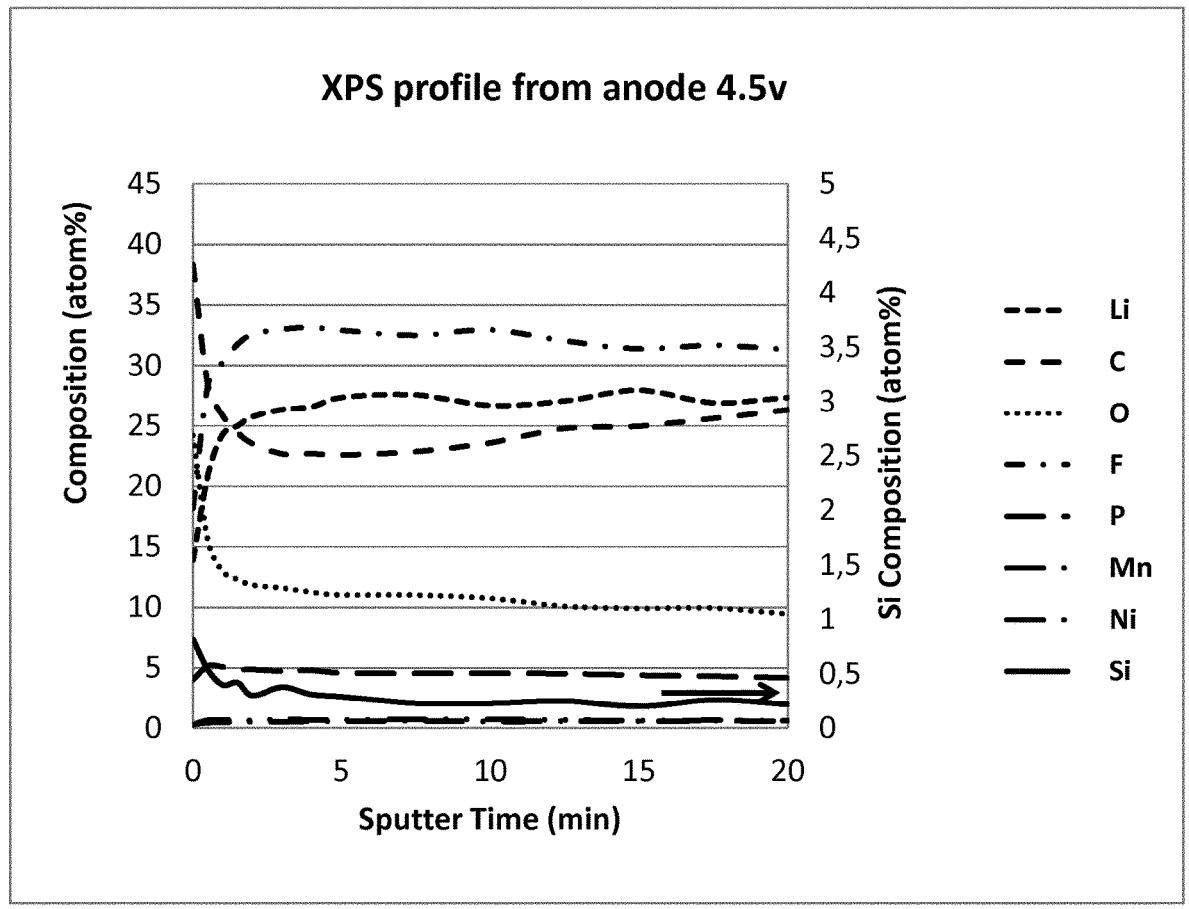
FIG. 2 shows the X-ray photoelectron spectroscopy depth profile of in-depth composition (atom %) from an anode of a coin cell of Comparative Example G after cycling.

The XPS depth profile results of the anode are shown in FIG. 2. These results show that silicon is present in the sub-surface region of the anode electrode interface.

The X-ray photoelectron analysis results of Comparative Examples J and K show that silicon is incorporated into the anode and cathode SEI layers when an electrochemical cell using an electrolyte composition comprising a silyl oxalate and LiPF$_6$ is electrochemically cycled. The subsurface of the anode SEI, investigated with depth profile analysis, also shows the presence of silicon, indicating that the silicon oxalate additive is modifying the composition of the SEI, and therefore, can impact the properties of the SEI. Without being bound to any theory, it is believed that this modification changes the nature and the interaction of the electrolyte with those interfaces, and may have a beneficial impact on the performance of the battery and its cycle life durability.

The invention claimed is:
1. An electrolyte composition comprising:
a) a fluorinated solvent;
b) at least one silyl oxalate represented by Formula I:

RR'Si(C$_2$O$_4$)  (I), wherein R, and R' are each the same or different from each other and independently selected from C$_1$-C$_8$ alkyl, C$_2$-C$_8$ alkenyl, C$_2$-C$_8$ alkynyl, or C$_6$-C$_{10}$ aryl radical, optionally comprising at least one substituent selected from halogen, hydroxyl, alkoxy, carbonyl, and carboxyl groups; and
c) LiPF$_6$.
2. The electrolyte composition of claim 1, wherein the silyl oxalate comprises dimethylsilyl oxalate, vinylphenylsilyl oxalate, methylvinylsilyl oxalate, or diphenylsilyl oxalate.
3. The electrolyte composition of claim 1, wherein the fluorinated solvent comprises:
a) a fluorinated acyclic carboxylic acid ester represented by the formula:

R$^1$—COO—R$^2$, b) a fluorinated acyclic carbonate represented by the formula:

R$^3$—OCOO—R$^4$, c) a fluorinated acyclic ether represented by the formula:

R$^5$—O—R$^6$, or mixtures thereof;

wherein
i) R¹ is H, an alkyl group, or a fluoroalkyl group;
ii) R³ and R⁵ is each independently a fluoroalkyl group and can be either the same as or different from each other;
iii) R², R⁴, and R⁶ is each independently an alkyl group or a fluoroalkyl group and can be either the same as or different from each other;
iv) either or both of R¹ and R² comprises fluorine; and
v) R¹ and R², R³ and R⁴, and R⁵ and R⁶, each taken as a pair, comprise at least two carbon atoms but not more than seven carbon atoms.

4. The electrolyte composition of claim 3, wherein the fluorinated acyclic carboxylic acid ester comprises CH₃—COO—CH₂CF₂H, CH₃CH₂—COO—CH₂CF₂H, F₂CHCH₂—COO—CH₃, F₂CHCH₂—COO—CH₂CH₃, CH₃—COO—CH₂CH₂CF₂H, CH₃CH₂—COO—CH₂CH₂CF₂H, F₂CHCH₂CH₂—COO—CH₂CH₃, CH₃—COO—CH₂CF₃, CH₃CH₂—COO—CH₂CF₂H, CH₃—COO—CH₂CF₃, H.COO—CH₂CF₂H, H—COO—CH₂CF₃, or mixtures thereof.

5. The electrolyte composition of claim 4, wherein the fluorinated acyclic carboxylic acid ester comprises CH₃—COO—CH₂CF₂H.

6. The electrolyte composition of claim 1, further comprising an organic carbonate.

7. The electrolyte composition of claim 6, wherein the organic carbonate comprises 4-fluoroethylene carbonate, ethylene carbonate, propylene carbonate, ethyl methyl carbonate, dimethyl carbonate, diethyl carbonate, vinylene carbonate, or mixtures thereof.

8. The electrolyte composition of claim 7, wherein the organic carbonate comprises 4-fluoroethylene carbonate.

9. An electrolyte composition comprising:
a) a fluorinated solvent; and
b) a lithium oxalato phosphate salt represented by Formula III:

$$\text{LiPF}_{(6-2q)}(C_2O_4)_q \quad \text{(III)}$$

wherein q is 1, 2 or 3;
wherein the oxalato phosphate salt comprises at least a portion that is derived from at least one silyl oxalate represented by Formula I:

$$RR'Si(C_2O_4) \quad \text{(I)},$$

wherein R and R' are each the same or different from each other and independently selected from $C_1$-$C_5$ alkyl, $C_2$-$C_8$ alkenyl, $C_2$-$C_8$ alkynyl, or $C_6$-$C_{10}$ aryl radical, optionally comprising at least one substituent selected from halogen, hydroxyl, alkoxy, carbonyl, and carboxyl groups.

10. The electrolyte composition of claim 9, wherein the silyl oxalate comprises dimethylsilyl oxalate, vinylphenylsilyl oxalate, methylvinylsilyl oxalate, or diphenylsilyl oxalate.

11. The electrolyte composition of claim 9, wherein the fluorinated solvent comprises a fluorinated acyclic carboxylic acid ester comprising CH₃—COO—CH₂CF₂H, CH₃CH₂—COO—CH₂CF₂H, F₂CHCH₂—COO—CH₃, F₂CHCH₂—COO—CH₂CH₃, CH₃—COO—CH₂CH₂CF₂H, CH₃CH₂—COO—CH₂CH₂CF₂H, F₂CHCH₂CH₂—COO—CH₂CH₃, CH₃—COO—CH₂CF₃, CH₃CH₂—COO—CH₂CF₂H, CH₃—COO—CH₂CF₃, H.COO—CH₂CF₂H, H—COO—CH₂CF₃, or mixtures thereof.

12. The electrolyte composition of claim 11, wherein the fluorinated acyclic carboxylic acid ester comprises CH₃—COO—CH₂CF₂H.

13. The electrolyte composition of claim 9, wherein the oxalato phosphate salt comprises lithium tris(oxalato)phosphate.

14. A method comprising:
a step of combining:
a) a fluorinated solvent;
b) at least one silyl oxalate represented by Formula I:

$$RR'Si(C_2O_4) \quad \text{(I)},$$

wherein R and R' are each the same or different from each other and independently selected from $C_1$-$C_8$ alkyl, $C_2$-$C_8$ alkenyl, $C_2$-$C_8$ alkynyl, or $C_6$-$C_{10}$ aryl radical, optionally comprising at least one substituent selected from halogen, hydroxyl, alkoxy, carbonyl, and carboxyl groups; and
c) LiPF6;
to form an electrolyte composition.

15. An electrochemical cell comprising:
(a) a housing;
(b) an anode and a cathode disposed in the housing and in ionically conductive contact with one another;
(c) the electrolyte composition of claim 9 disposed in the housing and providing an ionically conductive pathway between the anode and the cathode; and
(d) a porous separator between the anode and the cathode.

16. The electrochemical cell of claim 15, wherein the electrochemical cell is a lithium ion battery.

17. An electronic device, transportation device, or telecommunications device, comprising an electrochemical cell according to claim 15.

* * * * *